United States Patent
Gerszberg et al.

(10) Patent No.: US 6,480,748 B1
(45) Date of Patent: Nov. 12, 2002

(54) FACILITY MANAGEMENT PLATFORM FOR A HYBRID COAXIAL/TWISTED PAIR LOCAL LOOP NETWORK SERVICE ARCHITECTURE

(75) Inventors: Irwin Gerszberg, Kendall Park, NJ (US); Jeffrey S. Martin, Dover, NJ (US); Thomas Oplinger, Morristown, NJ (US); Philip Andrew Treventi, Murray Hill, NJ (US); Hopeton S. Walker, Haledon, NJ (US)

(73) Assignee: AT&T Corp., New York, NY (US)

(*) Notice: Subject to any disclaimer, the term of this patent is extended or adjusted under 35 U.S.C. 154(b) by 0 days.

(21) Appl. No.: 09/224,287

(22) Filed: Dec. 31, 1998

Related U.S. Application Data

(63) Continuation-in-part of application No. 09/001,422, filed on Dec. 31, 1997.

(51) Int. Cl.[7] .............................................. G05B 11/01
(52) U.S. Cl. ...................... 700/21; 700/19; 700/22; 700/29; 700/292; 700/293; 700/295; 709/217; 709/225; 709/237; 709/238; 370/282; 370/360; 379/14.07; 379/22.03; 379/221.02; 379/221.08; 379/247
(58) Field of Search ........................... 700/12.15, 17, 700/19–22, 79, 82, 292–295; 370/282, 355–359, 360; 709/22, 286, 217, 220, 225, 238, 237; 379/14.01, 22.03, 22.07, 114.01, 221.02, 221.08, 247

(56) References Cited

U.S. PATENT DOCUMENTS

| | | | | |
|---|---|---|---|---|
| 5,329,464 A | * | 7/1994 | Sumic et al. | 703/1 |
| 5,353,339 A | * | 10/1994 | Scobee | 379/207 |
| 5,421,030 A | * | 5/1995 | Baran | 725/106 |
| 5,568,399 A | * | 10/1996 | Sumic | 700/293 |
| 5,815,417 A | * | 9/1998 | Orr et al. | 703/5 |
| 5,859,879 A | * | 1/1999 | Bolgiano et al. | 370/330 |
| 5,937,201 A | * | 8/1999 | Matsushita et al. | 713/310 |
| 5,962,930 A | * | 10/1999 | Cluff et al. | 700/295 |
| 5,966,675 A | * | 10/1999 | Koeck | 700/292 |
| 6,041,356 A | * | 3/2000 | Mohammed | 709/227 |
| 6,049,539 A | * | 4/2000 | Lee et al. | 370/355 |
| 6,115,822 A | * | 9/2000 | Kim et al. | 700/295 |
| 6,144,659 A | * | 11/2000 | Nye et al. | 370/359 |
| 6,145,098 A | * | 11/2000 | Nouri et al. | 714/31 |
| 6,259,972 B1 | * | 7/2001 | Sumic et al. | 700/286 |

* cited by examiner

Primary Examiner—Ramesh Patel
(74) Attorney, Agent, or Firm—Banner & Witcoff, Ltd.

(57) ABSTRACT

A facility management platform (FMP) monitors and views the status of a plurality of individually addressable downstream devices including, but not limited to, addressable terminals, IRG's, settops, cable modems, taps, nodes, and/or hubs at a network control center. The FMP may display problems at these downstream devices, for example, power loss, and/or may automatically notify the appropriate companies and/or personnel to correct the problem.

11 Claims, 26 Drawing Sheets

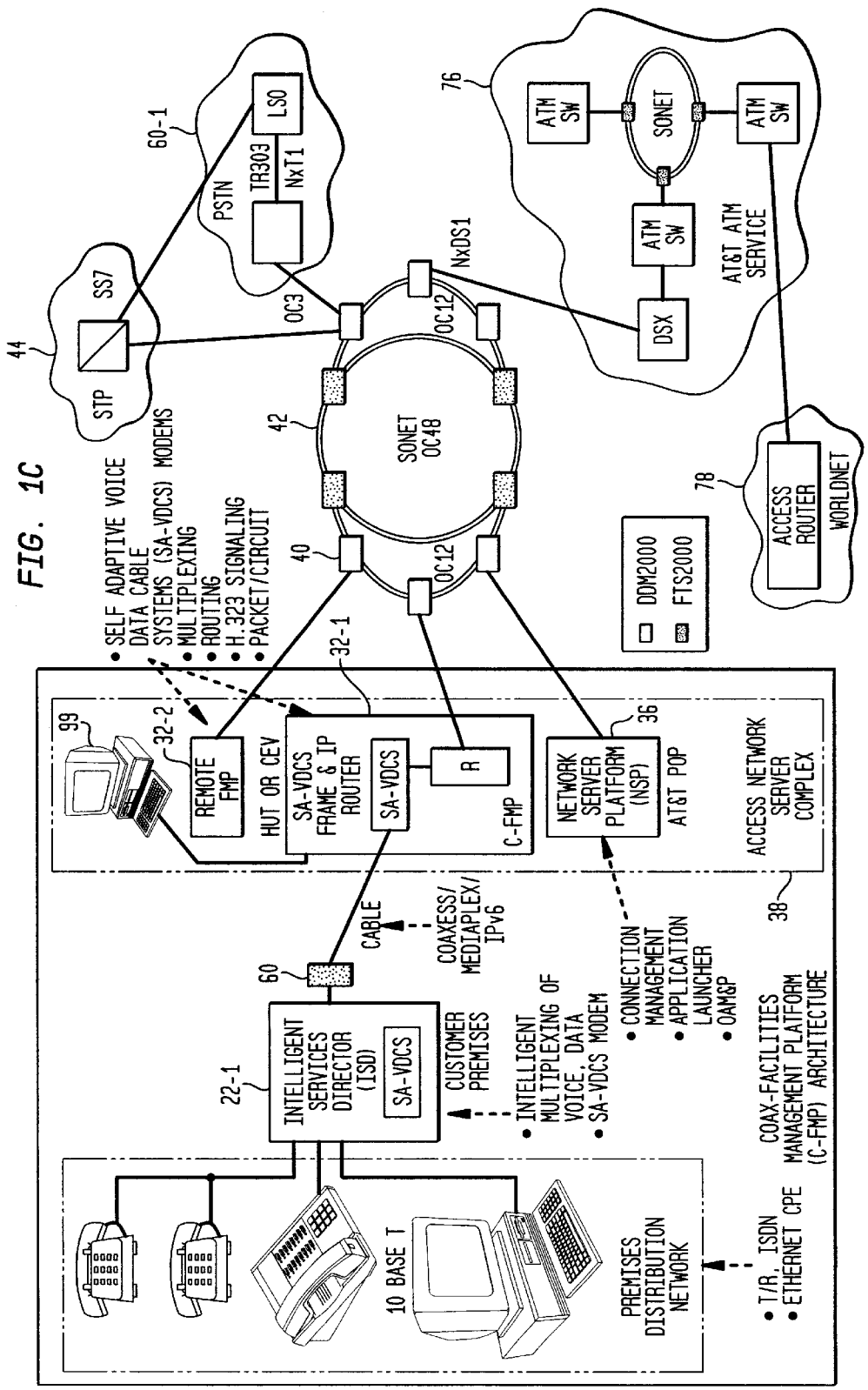

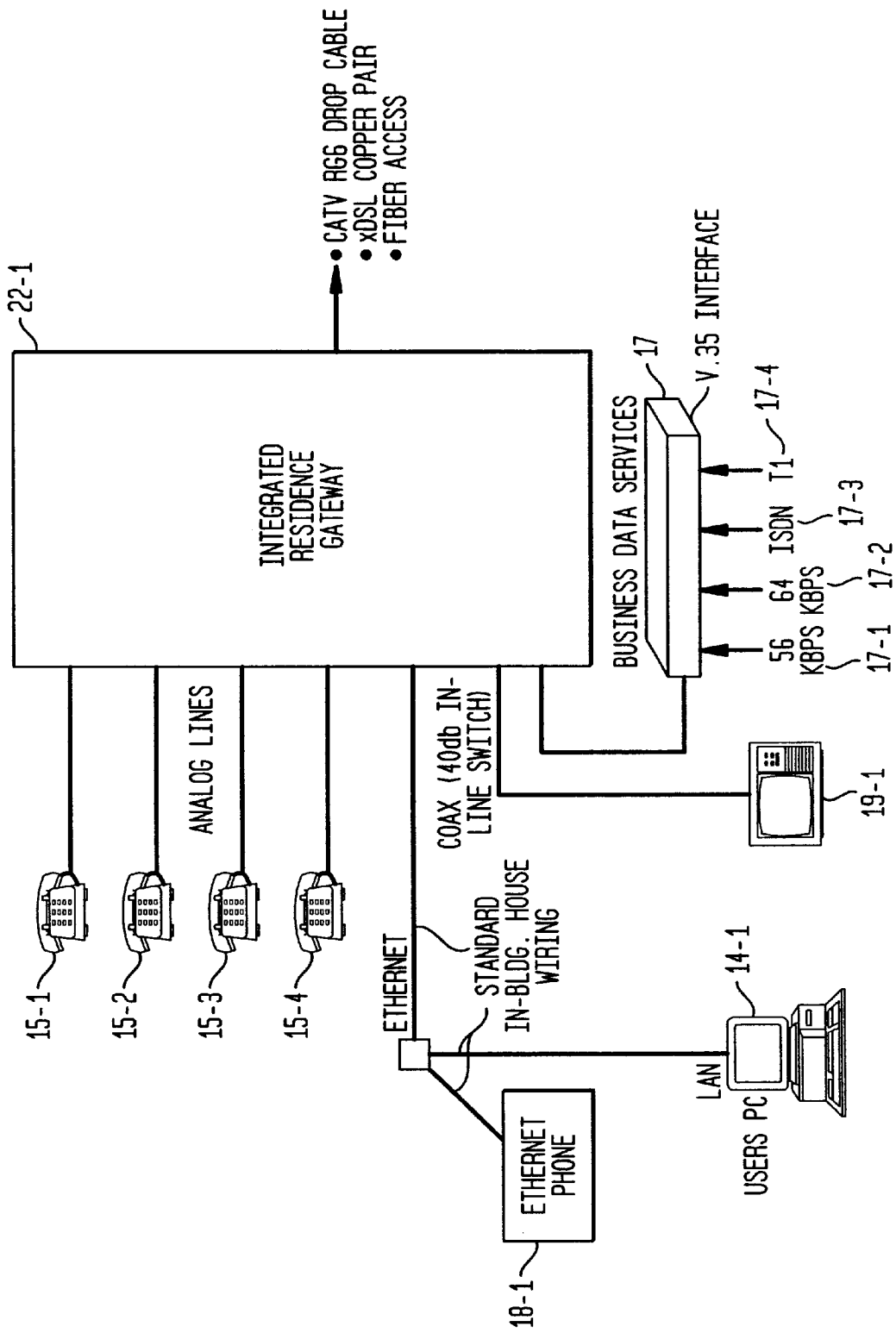

FACILITY MANAGEMENT PLATFORM FOR A HYBRID COAXIAL/TWISTED PAIR LOCAL LOOP NETWORK SERVICE ARCHITECTURE

This application is a continuation-in-part of U.S. application Ser. No. 09/001,422, filed Dec. 31, 1997.

FIELD OF THE INVENTION

The invention relates generally to telephone communication systems and, more particularly, to a facility management platform for providing services to telecommunications and cable service subscribers and for lifeline control management for supporting such services.

BACKGROUND

As deregulation of the telephone industry continues and as companies prepare to enter the local telephone access market, there is a need to offer new and innovative, high bandwidth services that distinguish common carriers from their competitors. This cannot be accomplished without introducing new local access network architectures that will be able to support these new and innovative services.

Conventionally, customer premises telephone and/or data connections contain splitters for separating analog voice calls from other data services such as Ethernet transported over digital subscriber line (DSL) modems. Voice band data and voice signals are sent through a communications switch in a central or local office to an interexchange carrier or Internet service provider. DSL data is sent through a digital subscriber loop asynchronous mode (DSLAM) switch which may include a router. The DSLAM switch connects many lines and routes the digital data to a telephone company's digital switch.

A major problem with this configuration is that interexchange carriers attempting to penetrate the local telephone company's territory must lease trunk lines from the local telephone company switch to the interexchange carrier company's network for digital traffic. Furthermore, the Internet service provider must lease a modem from the local phone company in the DSLAM switch and route its data through the local phone company's digital switch. Thus, the local phone company leases and/or provides a significant amount of equipment, driving up the cost of entry for any other company trying to provide local telephone services and making it difficult for the interexchange companies to differentiate their services. Furthermore, since DSL modem technology is not standardized, in order to ensure compatibility, the DSL modem provided by the local telephone company must also be provided to the end user in the customer premises equipment (CPE). Additionally, since the network is not completely controlled by the interexchange companies, it is difficult for the interexchange companies to provide data at committed delivery rates. Any performance improvements implemented by the interexchange companies may not be realized by their customers, because the capabilities of the local telephone company equipment may or may not meet their performance needs. Thus, it is difficult for the interexchange companies to convince potential customers to switch to their equipment or to use their services. These factors ensure the continued market presence of the local telephone company.

Another opportunity is for the interexchange carrier to employ wireless means of reaching the local telecommunications service subscriber. In copending U.S. patent application Ser. No. 09/001,363, filed Dec. 31, 1998, it was suggested to provide a wireless integrated service director for communicating with wireless subscriber apparatus. Also, from other U.S. Patent Applications, for example, U.S. patent application Ser. No. 08/783,388, now U.S. Pat. No. 5,978,370 filed Jan. 13, 1997, it is known to provide satellite or other wireless connections directly to the local subscriber, thus bypassing the local network and the local telephone company.

Yet another opportunity for bypassing the local telephone company is the provision of telecommunications services over known coaxial cable or hybrid optical fiber coaxial cable television transmission systems utilizing cable television spectrum in the downstream (toward the subscriber) and upstream (toward the cable television headend) paths for such services. For example, Times Warner has been experimenting with the provision of telecommunications services to and among cable television service subscribers in various geographic regions of the country with marginal success.

As part of this system, there is a need for improved architectures, services and equipment utilized to distinguish the interexchange companies' products and services. One such service enhancement is the need to monitor and control down stream taps and/or individual set top terminals to determine the lifeline support and/or power status of the taps and set top terminals.

SUMMARY OF THE INVENTION

In order to provide an improved network, it is desirable for the interexchange companies to have access to at least one of the twisted-pair lines, coaxial cable, hybrid fiber facilities with either twisted pair or coaxial cable or alternate wireless facility connecting each of the individual users to the local cable television or toll telephone or hybrid network before the lines are routed through the conventional local telephone network equipment. It is preferable to have access to these lines prior to any modem or switching technology offered by the local telephone service providers. By having access to the twisted-pair wires or coaxial cable or hybrid facilities entering or leading to the customer's premises, interexchange companies can differentiate their services by providing higher bandwidth, improving the capabilities of the customer premises equipment, and lowering overall system costs to the customer by providing competitive service alternatives.

The interexchange carrier may obtain access to the coaxial cable feeding subscribers to existing cable television services, for example, at a subscriber tap or after a fiber/coaxial cable hub or node in a hybrid fiber coaxial cable television distribution plant. The interexchange carrier may ultimately provide services via the optical fiber leaving the cable television headend. The cable television set top terminal may comprise a telecommunications apparatus or a separate cable modem connected intelligent terminal may provide such services as plain old telephone services, high speed Internet services, video conference services, directory services, multimedia services or other digital services depending on subscriber requirements and capabilities.

A new architecture for providing such services may utilize a video phone and/or other devices to provide new services to an end user; a residence gateway which may be an integrated residence gateway (IRG) disposed near the customer's premises for multiplexing and coordinating many digital services onto a single twisted-pair line or coaxial cable (or both); a cable facilities management platform (C-FMP) disposed remote from or in the local telephone network's central office, the subscriber loop or the coaxial cable distribution plant for routing data to an appropriate interexchange company network; and a network server platform (NSP) coupled to the C-FMP for providing new and innovative services to the customer and for distinguishing services provided by the interexchange companies from those services provided by the local telephone network.

As part of this system, the present invention provides a facility management platform to monitor and view the status of a plurality of individually addressable downstream devices including, but not limited to, addressable terminals, IRG's, settops, cable modems, taps, nodes, and/or hubs at a network control center. The FMP may display problems at these downstream devices, for example, power loss, and/or may automatically notify the appropriate companies and/or personnel to correct the problem.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

FIG. 1C illustrates an embodiment of FIG. 1B where an integrated residence gateway and coaxial cable facilities management platform (C-FMP) provide enhanced residence services via hybrid fiber coaxial cable distribution plant access.

FIG. 1E illustrates an expanded view of a residence architecture for enhanced CATV/telephony services.

DETAILED DESCRIPTION OF PREFERRED EMBODIMENTS

Figure 1A:
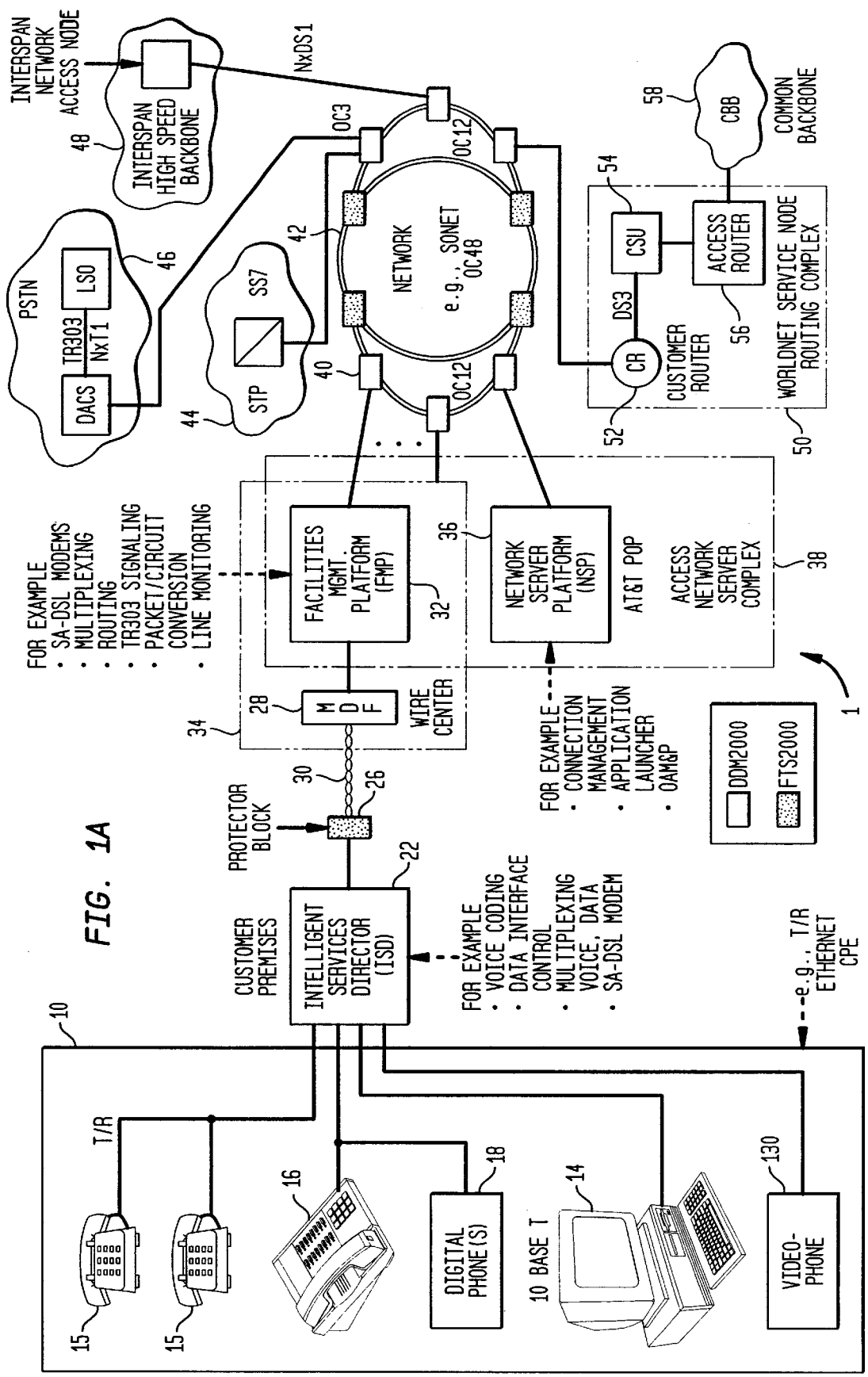
FIG. 1A illustrates an embodiment of a hybrid fiber twisted pair local loop architecture.

Referring to FIG. 1A, a first exemplary communication network architecture employing a hybrid fiber, twisted-pair (HFTP) local loop 1 architecture is shown. This network and an intelligent service director controlled set-top box are already described by U.S. patent application Ser. No. 09/001,424 filed Dec. 31, 1997; and that description is repeated here by way of introduction to a related and potentially overlapping or integrated architecture which will be described with reference to FIGS. 1B–1E. Similar reference numerals are used throughout to denote similar elements.

Figure 1B:
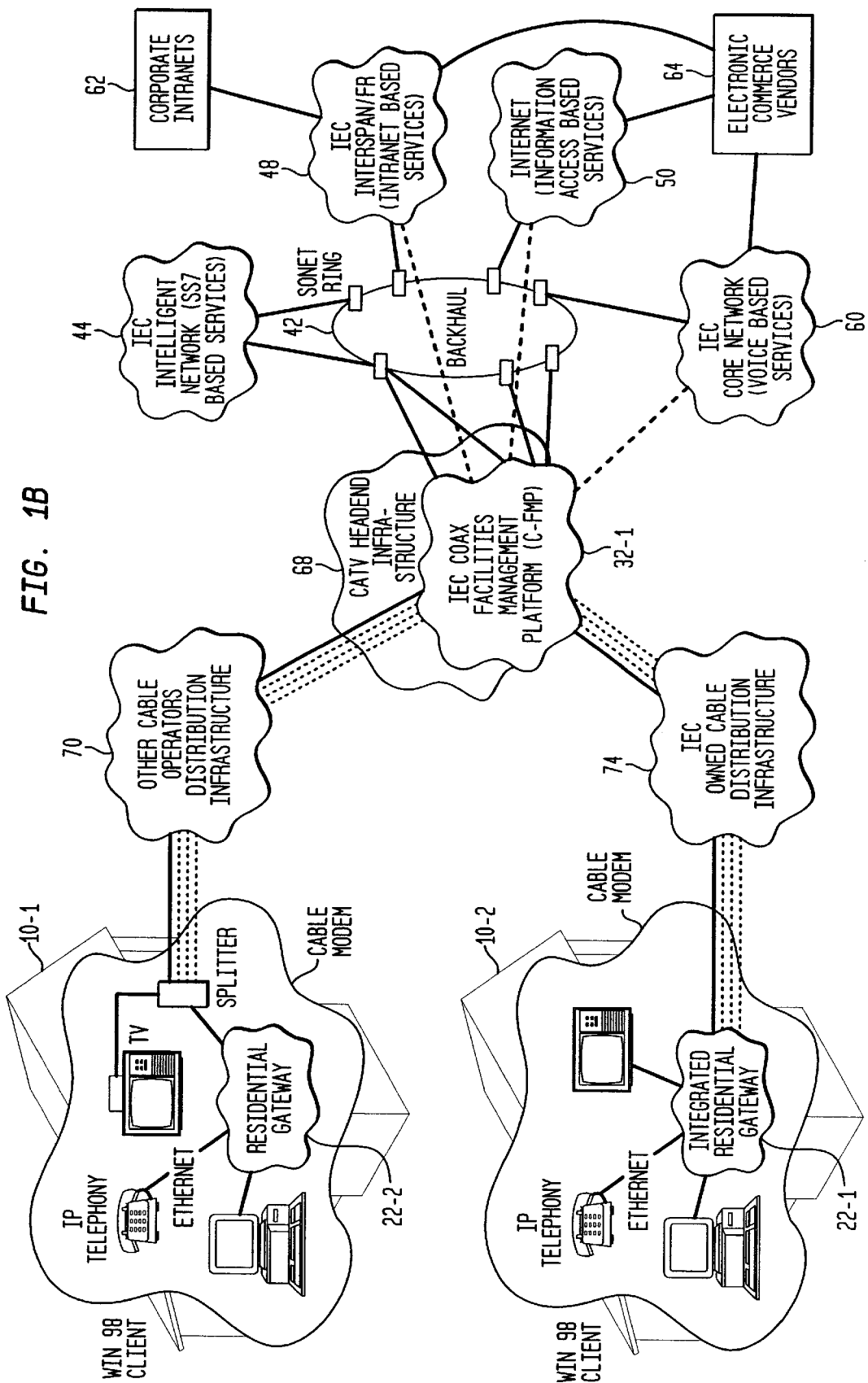
FIG. 1B illustrates alternative arrangements wherein an interexchange carrier may access a subscriber premises via an inter-exchange carrier owned or another cable television company.

According to FIG. 1A, an intelligent services director (ISD) 22 may be coupled to a telephone central office 34 via a twisted-pair wire, hybrid fiber interconnection, wireless and/or other customer connection 30, a connector block 26, and/or a main distribution frame (MDF) 28. Referring briefly to FIG. 1B, the ISD 22 is replaced by either a residential gateway 22-2 (when an interexchange carrier partners with a cable television service provider) or an integrated residential gateway 22-1 (when an interexchange carrier is integrated with the cable television service provider. FIG. 1B further shows other cable operators distribution infrastructure 70 or interexchange carrier (IXC) owned infrastructure 74 connected to a CATV headend infrastructure 68 which may include an inter-exchange carrier coaxial Cable Facilities Management Platform 32-1. Per FIG. 1B, the CATV headend 68 is in turn connected to a backhaul SONET ring 42 and to various alternative service networks including but not limited to IXC SS-7 based services 44, interspan, frame relay services 48 (to corporate intranets 62), and via frame relay 48, Internet service cloud 50 or IXC core network 60 to electronic commerce vendors 64.

Wireless communication in FIG. 1A may be via land-based intelligent base stations or by satellite. The ISD 22 and the telephone central or local office 34 may communicate with each other using, for example, framed, time division, frequency-division, synchronous, asynchronous and/or spread spectrum formats, but in exemplary embodiments uses DSL modem technology. The central office 34 preferably includes a facilities management platform (FMP) 32 for processing data exchanged across the customer connection 30. The FMP 32 may be configured to separate the plain old telephone service (POTS) from the remainder of the data on the customer connection 30 using, for example, a tethered virtual radio channel (TVRC) modem (shown in FIG. 4A). The remaining data may be output to a high speed backbone network (e.g., a fiber-optic network) such as an asynchronous transfer mode (ATM) switching network. The analog POTS data may be output directly to a public switch telephone network (PSTN) 46, and/or it may be digitized, routed through the high speed backbone network, and then output to the PSTN 46.

Figure 1D:
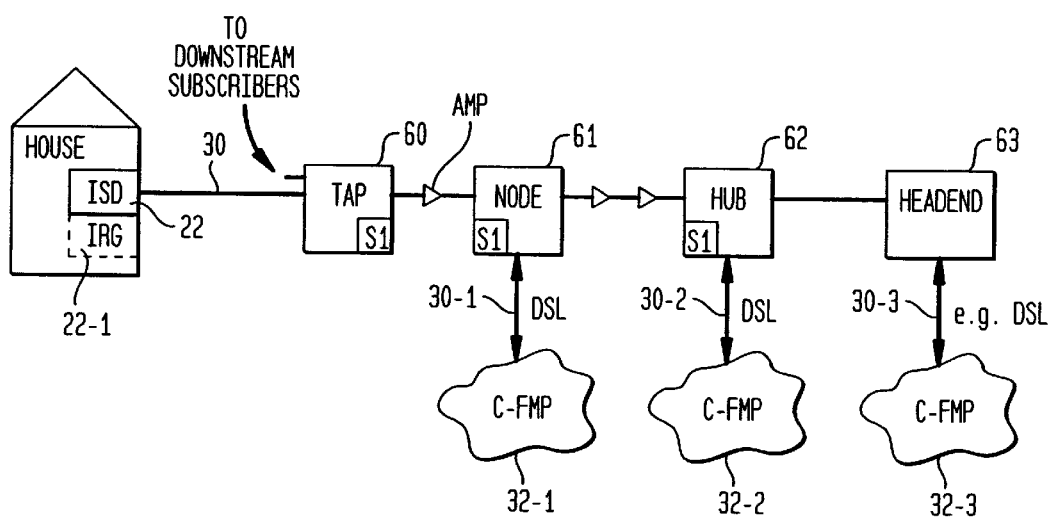
FIG. 1D illustrates an embodiment of a hybrid fiber coaxial cable local loop architecture that shows when the C-FMP may connect within the architecture of FIG. 1B or FIG. 1C.

As will be discussed in connection with FIGS. 1B–1E, an alternative or integrated way of reaching subscriber 10 to hybrid fiber/twisted pair facilities is via hybrid fiber/coaxial cable facilities of a cable television service provider. Such an arrangement may bypass the local subscriber loop and the local telephone switching central office or wire center 34 altogether. There are several varieties of hybrid fiber coaxial cable distribution facilities. In one embodiment, fiber is provided to curb; that is, fiber reaches the subscriber tap where from the tap, coaxial cable is "dropped" or provided via an underground pedestal to the customer premises. In another embodiment, fiber reaches an active amplifier chain for providing downstream services to several thousand subscribers. In yet another embodiment, fiber reaches a plurality of microcells of customer premises which can be served by passive (rather than active) devices. Referring briefly to FIG. 1-C and 1-D, a cable facilities management platform (C-FMP) 32-1, 32-2, 32-3, in such an alternative, may be located at the telephone central office, a cable television headend (as per FIG. 1-B) or: in the cable television signal distribution plant, for example, at a fiber/coax node or hub.

Referring again to FIG. 1A, the FMP 32 may process data and/or analog/digitized voice between customer premise equipment (CPE) 10 and any number of networks. For example, the FMP 32 may be interconnected with a synchronous optical network (SONET) 42 for interconnection to any number of additional networks such as an InterSpan backbone 48, the PSTN 46, a public switch switching network (e.g. call setup SS7-type network 44), and/or a network server platform (NSP) 36. Alternatively, the FMP 32 may be directly connected to any of these networks. One or more FMPs 32 may be connected directly to the high speed backbone network (e.g., direct fiber connection with the SONET network 42) or they may be linked via a trunk line (e.g., trunks 40 or 42) to one or more additional networks.

Similarly, referring to FIG. 1C, remote FMP 32-2, C-FMP 32-1 and a network server platform 36 are connected to SONET, for example, an OC48 ring 42 with ports 40 for connection to telephony out-of-band signaling SS7 network 44, ATM cloud 76 or Internet network 78, frame relay networks, interworked networks or other networks (not shown).

In either FIG. 1A or FIG. 1C, the NSP 36 may provide a massive cache storage for various information that may be provided across the SONET net 42 to the FMP 32 of C-FMP 32-1 and out to the ISD 22 (FIG. 1A) or residential gateways 22-1 or 22-2 (FIG. 1-B). The NSP 36 and the FMP 32 or C-FMP 32-1 may collectively define an access network server complex 38. The NSP 36 may be interconnected with multiple FMPs or C-FMP's 32. Furthermore, each FMP/C-FMP 32 may interconnect with one or more ISDs 22 or IRGs. The NSP 36 may be located anywhere but is preferably located in a point-of-presence (POP) facility. The NSP 36 may further act as a gateway to, for example, any number of additional services.

The ISD 22 or IRG 22-1 (FIG. 1A, 1E) may be interconnected to various devices such as a videophone 130, other digital phones 18, set-top devices (not shown), computers 14, and/or other devices 15, 16 comprising the customer premise equipment 10. Per FIG. 1E, the IRG 22-1 is shown coupled with a plurality of analog lines 15-1 to 15-4 to a business data services interface 17, for example, a set of V. 35 interfaces, for providing various digital bandwidth services such as an 56 Kbps service 17-1, 64 Kbps service 17-2, ISDN service 17-3 and T1 (1.544 Megabps service) 17-4. An Ethernet link serves an Ethernet telephone 18-1 and the user's personal computer local area network including PC 14-1 provided via telephone house wiring. The user's television 19-1 and other coaxial cable fed devices are connected to CATV and enhanced services via in-house coaxial cable.

The customer premise equipment 10 may individually or collectively serve as a local network computer at the customer site. Application applets may be downloaded from the NSP 36 into some or all of the individual devices within the customer premise equipment 10. Where applets are provided by the NSP 36, the programming of the applets may be updated such that the applets are continually configured to the latest software version by the interexchange carrier. In this way, the CPE 10 may be kept up to date by simply re-loading updated applets. In addition, certain applets may be resident on any of the CPE 10. These resident applets may be periodically reinitialized by simply sending a request from, for example, a digital phone 18 and/or a videophone 130 to the FMP 32 or C-FMP 32-1 and thereafter to the NSP 36 for reinitialization and downloading of new applets. To ensure widespread availability of the new features made possible by the present architecture, the customer premise equipment 10 may be provided to end users either at a subsidized cost or given away for free, with the cost of the equipment being amortized over the services sold to the user through the equipment.

Referring to FIG. 1D, similar reference characters are utilifized to denote similar elements. While a house is depicted, any customer premises is intended, for example, a personal residence, a multiple dwelling unit or a small or large business premises. In many such situations, the intelligent services director (ISD) 22 or integrated residence gateway 22-1 introduced above may be mounted to the side of the premises, in an accessible wire closet inside the premises or in the basement among other places discussed herein. In a cable television arrangement, facility 30 coupling tap 60 to a premises is typically a coaxial cable or may comprise a CommScope or other cable manufacturer headend cable that comprises both coaxial cable and twisted pairs, for example, the CommScope 3-22 which provides three 22 gauge audio pair in addition to a coaxial cable television drop. Power also may be fed down the drop to power the ISD 22. Likewise the facility from node 61 to tap 60 may comprise such a coaxial cable facility or, in a fiber to the curb arrangement, may comprise optical fiber. Similarly, the facility linking hub 62 and node 61 may comprise an optical fiber or a coaxial cable. In a hybrid fiber coaxial cable arrangement the facility connecting headend 63 and hub 62 is typically an optical fiber and in a conventional cable television system comprises a coaxial cable.

As shown in FIG. 1D, the C-FMP 32-1 may be connected to a node 61 of a hybrid fiber coaxial cable plant typically with coaxial cable in and out of the node and where active amplifier or passive devices are provided for providing service to downstream subscribers. A C-FMP 32-2 may be connected to a hub 62 of a hybrid fiber coaxial cable television plant where the fiber typically terminates and the coaxial cable link to a plurality of subscribers (not shown) begins. Also, a C-FMP 32-3 is shown coupled to the cable television headend 63 where cable television service for a geographic region over a hybrid fiber coaxial cable or pure coaxial cable facility originates. If the C-FMP 32 is not located at the headend, hub, or node, the facility between the C-FMP 32 and these may comprise an DSL twisted pair facility in one embodiment shown or a coaxial cable or optical fiber in another embodiment.

A known coaxial cable television tap 60 is shown where 1, 2, 4 or up to 8 subscriber drop cables tie in to the coaxial cable serving downstream subscribers. Tap 60 comprises a directional coupler for permitting a subscriber to tap into the main downstream coaxial cable to receive service. When a tap is being serviced or repaired, the downstream service is typically interrupted for the duration of the service or repair. It is a principle of the present invention to design the tap or the service so that "lifeline" support may be provided to a customer over a coaxial cable facility. Such a scenario means that both service and power for powering a subscriber telephone device may not be interrupted. The tap may be provided, for example, with a redundant switchable coupler such that one, when taken out-of-service may leave the other redundant coupler in service and power pass-through to downstream subscribers.

Power in a cable television system is typically provided for powering active amplification devices. Set top terminals are typically powered from AC power lines within the premises. The downstream cable television power is typically 90 V AC. In telephony, the line power is typically 48 volts DC. Thus there is a difference between telephone and cable television power services. Furthermore, the tap and drop cable for television service may be over the same strand or a different strand and may enter the premises in a different entry way than the drop wire for telephone. House wiring systems of coaxial cable in cable television and twisted pair for telephony may be totally different and are completely within the control of the subscriber, the television service provider and/or the telephone service provider. These differences must be accounted for in design of a particular premises installation.

Figure 2:
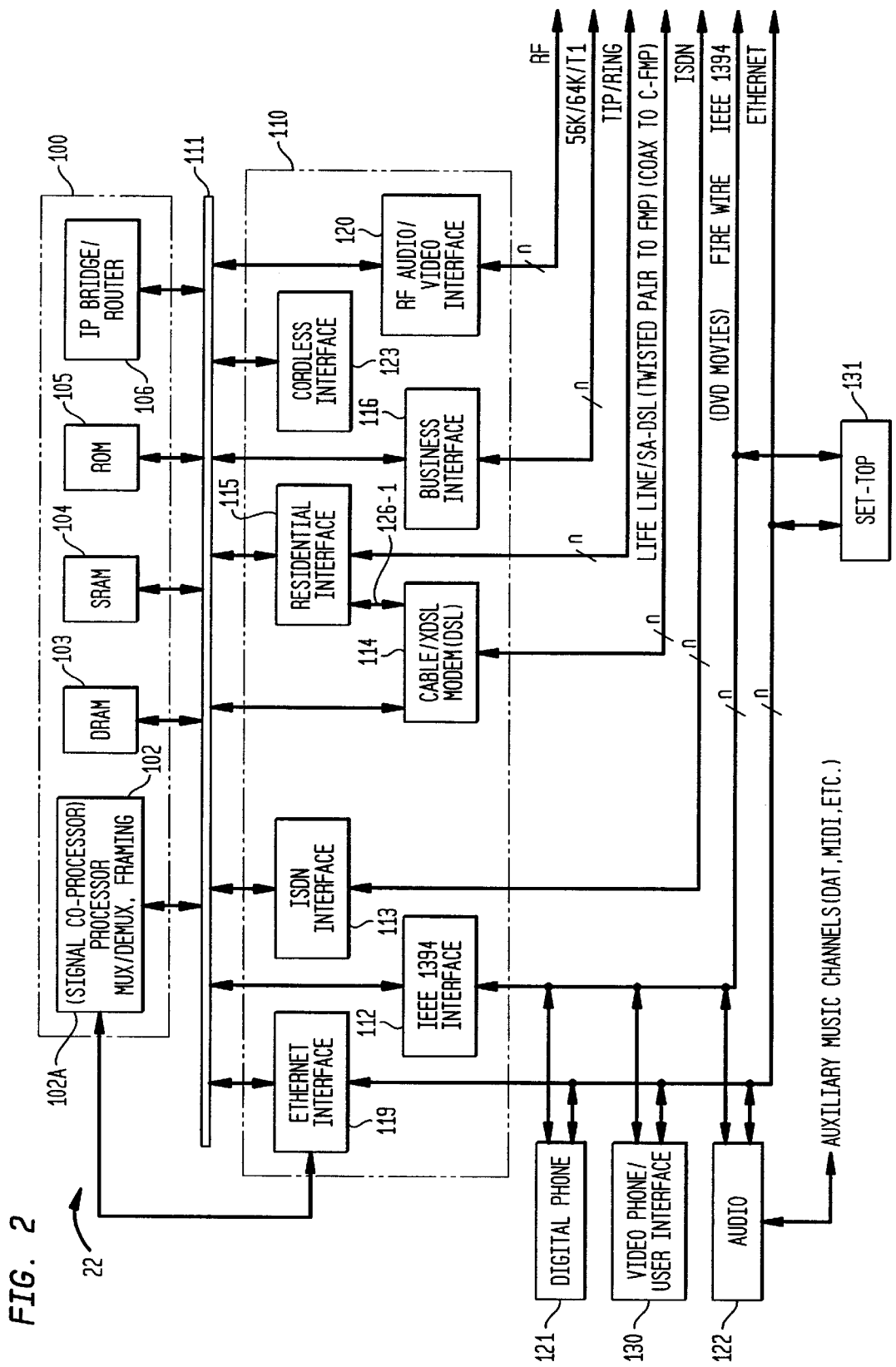
FIG. 2 is a block diagram of an embodiment of an integrated residence gateway consistent with the architecture shown in FIG'S. 1A and 1B.

Referring to FIG. 2, there is shown an integrated residence gateway 22 which is very similar to an intelligent service director 22 discussed in earlier U.S. application Ser. No. 09/001,424, filed Dec. 31, 1997. The IRG 22 may connect with a variety of devices including analog and digital voice telephones 15, 18; digital videophones 130, devices for monitoring home security, meter reading devices (not shown), utilities devices/energy management facilities (not shown), facsimile devices 16, digital audio devices via audio interface 122, personal computers 14, cable television set top devices 131 and/or other digital or analog devices. Some or all of these devices may be connected with the IRG 22 via any suitable mechanism such as a single and/or multiple twisted-pair wires, in-premises coaxial cable and/or a wireless connection. For example, a number of digital devices may be multidropped on a single twisted-pair (to FMP) or coaxial cable (to C-FMP) connection. Similarly, analog phones and other analog devices may be multi-dropped using conventional techniques. Settop cable television terminals 131 or personal computers utilizing cable modem bandwidth Internet services are typically coupled to IRG 22 to coaxial cable lines run within the home. Alternatively, services are provided via an Ethernet interface 119 or other high bandwidth interface.

The IRG 22 may be located within the home/business, in a wire closet, in the basement or mounted exterior to the home/business. The IRG 22 may operate from electrical power supplied by the local or central office 34, by power supplied by the headend 63 and/or from the customer's power supplied by the customer's power company. Where the IRG 22 includes a xDSL/cable modem 114 e.g. a TVRC/CATV modem, it may be desirable to power the IRG 22 with supplemental power from the home in order to provide sufficient power to enable the optimal operation of the xDSL/cable modem e.g. a TVRC/CATV modem As shown in FIG. 2, in some embodiments the IRG 22 may include a controller 100 which may have any of a variety of elements such as a central processing unit 102, a DRAM 103, an SRAM 104, a ROM 105 and/or an Internet protocol (IP) bridge router 106 connecting the controller 100 to a system bus 111. The system bus 111 may be connected with a variety of network interface devices 110. The network interface devices 110 may be variously configured to include an integrated services digital network (ISDN) interface 113, an Ethernet interface 119 (e.g., for 10 Base T, 100 Base T, etc.), an IEEE 1394 "fire wire" interface 112 (e.g., for a digital videodisc device (DVD)), a xDSL/cable modem interface 114 (e.g. a TVRC/CATV modem), a residential interface 115, (e.g., standard POTS phone systems such as tip ring), a business interface 116 (e.g., a T1 line or slower data speed and/or PABX interface), a radio frequency (RF) audio/video interface 120 (e.g., a coaxial cable television connection to a set-top box/television or to a personal computer), and a cordless phone interface 123 (e.g., a 900 MHZ or other unlicensed frequency transceiver). Connected to one of the network interfaces and/or the system bus 111 may be any number of devices such as an audio interface 122 (e.g., for digital audio, digital telephones, digital audio tape (DAT) recorders/players, music for restaurants, MIDI interface, DVD, etc.), a digital phone 121, a videophone/user interface 130, a television set-top device 131 and/or other devices. Where the network interface is utilized, it may be desirable to use, for example, the IEEE 1394 interface 112 and/or the Ethernet interface 119.

A lifeline 126 may be provided for continuous telephone service in the event of a power failure at the CPE 10. The lifeline 126 may be utilized to connect the IRG 22 to the local telecommunications company's central office 34 and, in particular, to the FMP 32 or C-FMP 32 located in the central office 34. Lifeline 126 may connect to Tip/Ring (conventional) and may be provided as lifeline 126-1 via DSL modem 114 to twisted pair or via integral or separate cable modem 114 to coaxial cable.

A fundamental difference between an ISD and the integrated residence gateway of the present invention is the IRG's ability to receive or transmit signals over a coaxial drop or a twisted pair drop or both. A TVRC modem and a cable modem operate according to different protocols. Typically, the twisted pair facility is terminated by a TVRC modem which provides available bandwidth services over a dedicated twisted pair subscriber loop while the cable modem provides an upstream band of frequencies of approximately 540 Megahertz susceptible to noise ingress over the cable plant and as much as one gigahertz of bandwidth in the downstream direction. Both upstream and downstream bandwidth is shared with other upstream subscribers.

A typical cable modem, for example, one implementing a data over cable service interface specification (DOCSIS), comprises QPSK or 16-QAM modulation for upstream transmission and 64 or 256 point QAM for downstream transmission. Each 6 MHZ downstream or upstream channel can provide up to 38 Mbps data service in accordance with quality of service constraints since the bandwidth is shared with other downstream and upstream subscribers. Some studies suggest that up to 200 or more subscribers can share the bandwidth effectively. In the upstream direction due to various issues a 10 Mbps may be provided. In contrast to Ethernet's CSMA/CD protocol, the DOCSIS access scheme provides cable/telephone operators the opportunity to fill their pipelines at 75% or greater of their theoretical capacity. Data encryption, for example, DES-based encryption/decryption, provides privacy to users of the shared upstream and downstream bandwidth.

The ISD/IRG 22 may be variously configured to provide any number of suitable services. For example, the ISD/IRG 22 may offer high fidelity radio channels by allowing the user to select a particular channel and obtaining a digitized radio channel from a remote location and outputting the digital audio, for example, on audio interface 122, video phone 130, and/or digital phones 121. A digital telephone may be connected to the audio interface 122 such that a user may select any one of a number of digital audio service channels by simply having the user push a digital audio service channel button on the telephone and have the speaker phone output particular channels. The telephone may be preprogramed to provide the digital audio channels at a particular time, such as a wake up call for bedroom mounted telephone, or elsewhere in the house. The user may select any number of services on the video phone and/or other user interface such as a cable set-top device 131. These services may include any number of suitable services such as weather, headlines in the news, stock quotes, neighborhood community services information, ticket information, restaurant information, service directories (e.g., yellow pages), call conferencing, billing systems, mailing systems, coupons, advertisements, maps, classes, Internet, pay-per-view (PPV), and/or other services using any suitable user interface such as the audio interface 122, the video phone/user interface 130, digital phones, 121 and/or another suitable device such as a settop device 131.

In further embodiments, the ISD/IRG 22 may be configured as an IP proxy server such that each of the devices connected to the server utilizes transmission control protocol/Internet protocol (TCP/IP) protocol. This configuration allows any device associated with the ISD/IRG to access the Internet via an IP connection through the FMP/C-FMP 32. Where the ISD/IRG 22 is configured as an IP proxy server, it may accommodate additional devices that do not support the TCP/IP protocol. In this embodiment, the ISD/IRG 22 may have a proprietary or conventional interface connecting the ISD/IRG 22 to any associated device such as to the set top box 131, the personal computer 14, the video telephone 130, the digital telephone 18, and/or some other end user device.

In still further embodiments, the ISD/IRG 22 may be compatible with multicast broadcast services where multicast information is broadcast by a central location and/or other server on one of the networks connected to the FMP/C-FMP 32, e.g., an ATM-switched network. The ISD/IRG 22 may download the multicast information via the FMP/C-FMP 32 to any of the devices connected to the-ISD/IRG 22. The ISD/IRG 22 and/or CPE 10 devices may selectively filter the information in accordance with a specific customer user's preferences. For example, one user may select all country music broadcasts on a particular day while another user may select financial information. The ISD/IRG 22 and/or any of the CPE 10 devices may also be programmed to store information representing users' preferences and/or the received uni-cast or multicast information in memory or other storage media for later replay. Thus, for example, video clips or movies may be multicast to all customers in the community with certain users being pre-configured to select the desired video clip/movie in real time for immediate viewing and/or into storage for later viewing.

The IRG of FIG. 2 may collect subscriber (user) preference data such as equipment and service preferences, service usage data, for example, pay-per-view usage data or utility meter data, viewing/accessing statistics such as shows watched or Internet URL's accessed, new equipment/service installs, and the like for whatever purposes including the downloading of coupons/discounts/premiums for equipment and service preferences and discounted billing. Some of the collected data may be done transparent to the subscriber knowing while other data such as some user preference data may be intentionally input by the subscriber. For example, the user may utilize their remote control to enter preference data that may be stored by a set top device for uploading to the IRG or may utilize their visionphone terminal or personal computer terminal, all of which are coupled to the IRG.

The IRG is addressable and may be polled for the data periodically, stored for example in RAM 103. If the IRG periodically reports, the unique address of the IRG should be transmitted with the communication. There may be several IRG's associated with a tap 60 for several subscribers, all mounted on a telephone pole and so more secure from service pirates than a set top device in the home. The IRG may include encryption/decryption modules for encrypting private communications such as billing and service usage data.

Figure 3A:
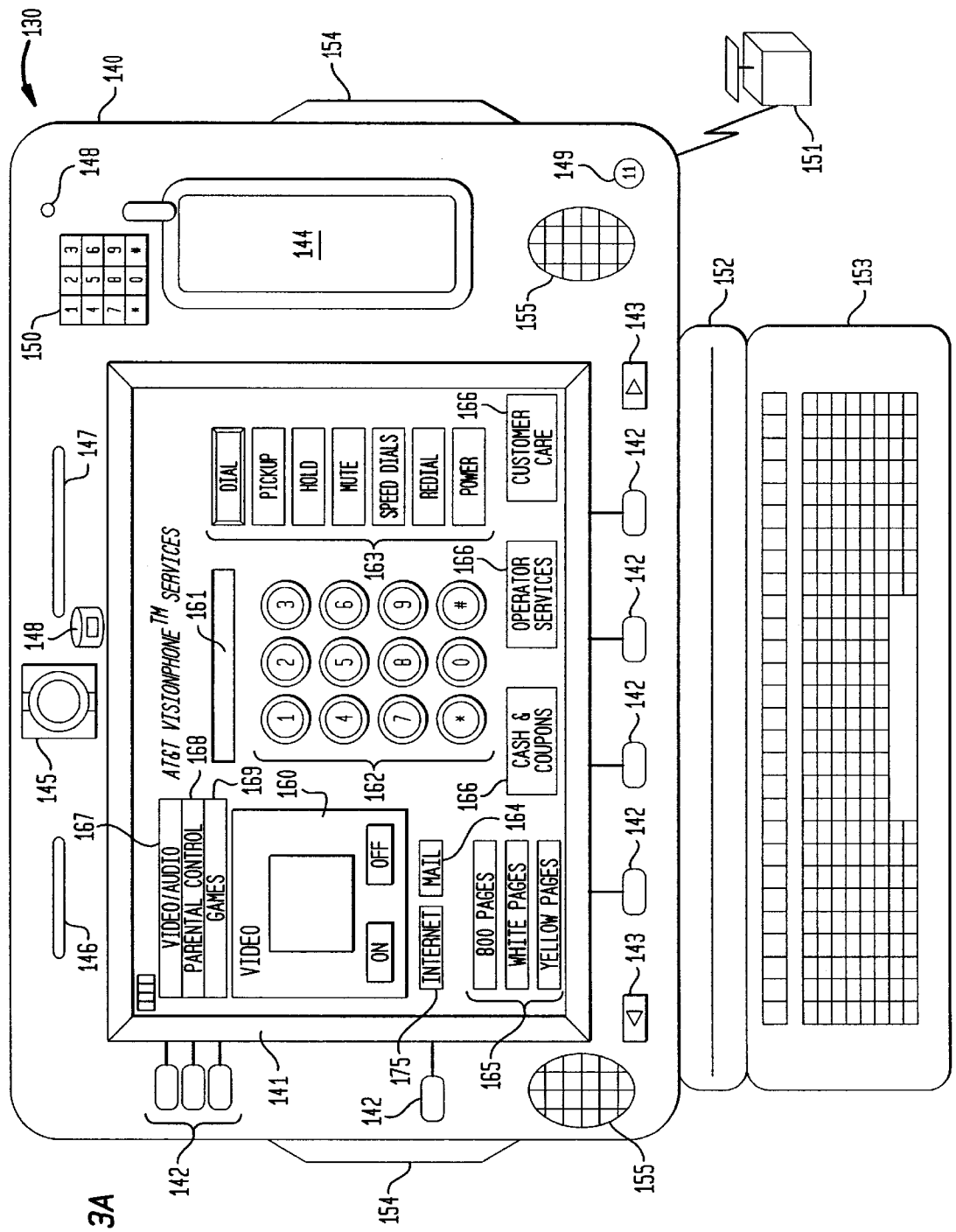
FIGS. 3A and 3B illustrate an embodiment of a video phone consistent with the architecture shown in FIG. 1.
Figure 3B:
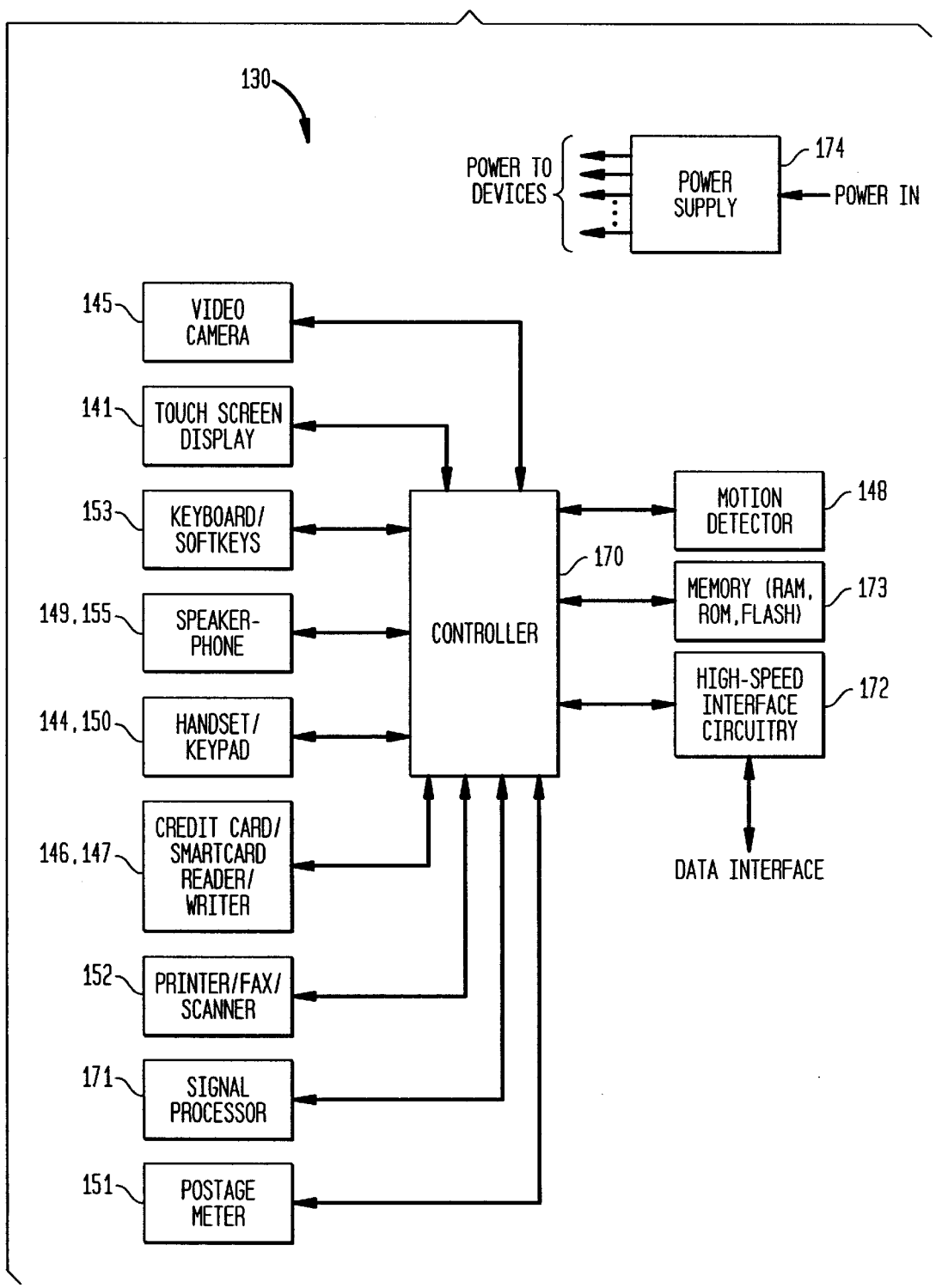

Referring to FIG. 3A, a videophone 130 may include a touch screen display 141 and soft keys 142 around the perimeter of the display 141. The display may be responsive to touch, pressure, and/or light input. Some or all of the soft keys 142 may be programmable and may vary in function depending upon, for example, the applet being run by the videophone 130. The function of each soft key may be displayed next to the key on the display 141. The functions of the soft keys 142 may also be manually changed by the user by pressing scroll buttons 143. The videophone 140 may also include a handset 144 (which may be connected via a cord or wireless connection to the rest of the videophone and/or directly to the ISD), a keypad 150, a video camera 145, a credit card reader 146, a smart card slot 147, a microphone 149, a motion and/or light detector 148, built-in speaker(s) 155, a printer/scanner/facsimile 152, and/or external speakers 154 (e.g., stereo speakers). A keyboard 153 and/or a postage scale 151 may also be connected to the videophone 130. Any or all of the above-mentioned items may be integrated with the videophone unit itself or may be physically separate from the videophone unit. A block diagram of the video phone unit is shown in FIG. 3B. Referring to FIG. 3B, in addition to the items above, the video phone 130 may also include a signal processor 171, high speed interface circuitry 172 (to house wire or coaxial cable), memory 173, power supply 174, all interconnected via a controller 170.

When the videophone 130 is used as a video telephone, the display 141 may include one or more video window(s) 160 for viewing a person to whom a user is speaking and/or showing the picture seen by the person on the other end of the video phone. The display may also include a dialed-telephone-number window 161 for displaying the phone number dialed, a virtual keypad 162, virtual buttons 163 for performing various telephone functions, service directory icons 165, a mail icon 164, and/or various other service icons 166 which may be used, for example, for obtaining coupons or connecting with an operator. Any or all of these items may be displayed as virtual buttons and/or graphic icons and may be arranged in any combination. Additionally, any number of other display features may be shown on the video phone in accordance with one or more of the applications incorporated by reference below.

Figure 4A:
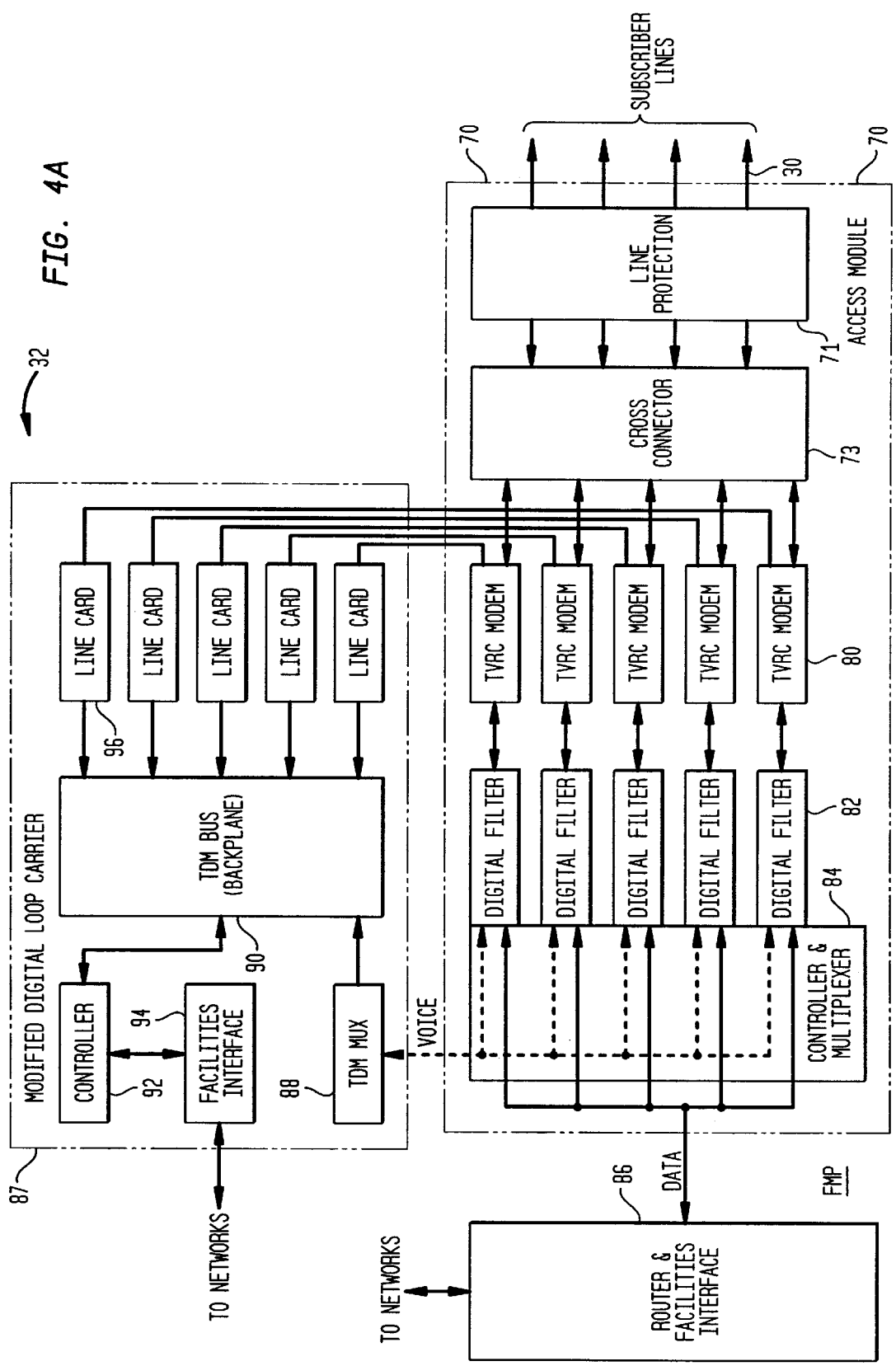
FIG. 4A is a block diagram of an embodiment of a facilities management platform consistent with the architecture shown in FIG. 1.

Referring to FIG. 4A, the FMP/C-FMP 32 may coordinate the flow of data packets, separate voice signals from other signals, perform line monitoring and switching functions, and/or convert between analog and digital signals. The FMP/C-FMP 32 may process data sent from the CPE 10 to the central or local office 34 by separating and reconstructing analog voice signals, data, and control frames. The FMP/C-FMP 32 may process data sent from the central or local office 34 to the CPE 10 by separating control messages from user information, and configure this information into segments that for transport across the digital subscriber loop. The FMP/C-FMP 32 may also terminate the fink layer associated with the digital subscriber loop.

In some embodiments, the FMP/C-FMP 32 may include an access module 70 and a digital loop carrier 87. The access module 70 may include a line protector 71, a cross-connector 73, a plurality of xDSL/cable modems 80, e.g. TVRC/CATV modems, a plurality of digital filters 82, a controller multiplexer 84, and/or a router and facilities interface 86. The digital loop carrier 87 may include a plurality of line cards 96, a time domain multiplexing (TDM) multiplexor (MUX) 88, a TDM bus 90, a controller 92, and/or a facilities interface 94.

During normal operations, digital signals on the customer connection 30 (e.g., twisted-pair lines, coaxial cable, or hybrid facility) containing both voice and data may be received by the xDSL/cable modems 80, e.g. TVRC/CATV modems, via the line protector 71 and the cross-connector 73. Preferably, the line protector 71 includes lightning blocks for grounding power surges due to lightning or other stray voltage surges. The xDSL/cable modems 80, e.g. TVRC/CATV modems, may send the digital voice, picture and/or data signals to the controller multiplexer 84 and the digital filters 82. The digital. filters 82 may separate the voice signals from the digital data signals, and the controller multiplexor 84 may then multiplex the voice signals and/or data signals received from the digital filters 82. The controller multiplexor 84 may then send multiplexed voice signals to the TDM MUX 88 and the data signals to the router and facilities interface 86 for transmission to one or more external networks. The TDM MUX 88 may multiplex the voice signals from the controller multiplexor 84 and/or send the voice signals to the TDM bus 90, which may then send the digital voice signals to the controller 92 and then to the facilities interface 94 for transmission to one or more external networks. Both the router and facilities interface 86 and the facilities interface 94 may convert between electrical signals and optical signals when a fiber optic link is utilized.

When there is a failure of the digital data link (e.g., if there is a failure of the xDSL/cable modems 80, e.g. TVRC/CATV modems, at the FMP/C-FMP 32 or the xDSL/cable modems 114, e.g. TVRC/CATV modems, at the ISD/IRG 22), only analog voice signals might be sent over the subscriber lines 30 (twisted pair or coax). In such a case, the analog voice signals may be directly routed to the line cards 96, bypassing the xDSL/cable modems 80, e.g. TVRC/CATV modems, the digital filters 82, the controller multiplexor 84, and the TDM MUX 88. Thus, voice communication is ensured despite a failure of the digital data link. The line cards 96 may convert the analog voice signals into digital format (e.g., TDM format) and send the digitized voice data onto the TDM bus 90 and eventually through the controller 92 and the facilities interface 94 for transmission to one or more external networks. Since the ISD/IRG 22 may be powered via the serving cable (telephone or coaxial cable television), lifeline service may be provided over the cable modem or the twisted pair tip and ring.

Figure 4B:
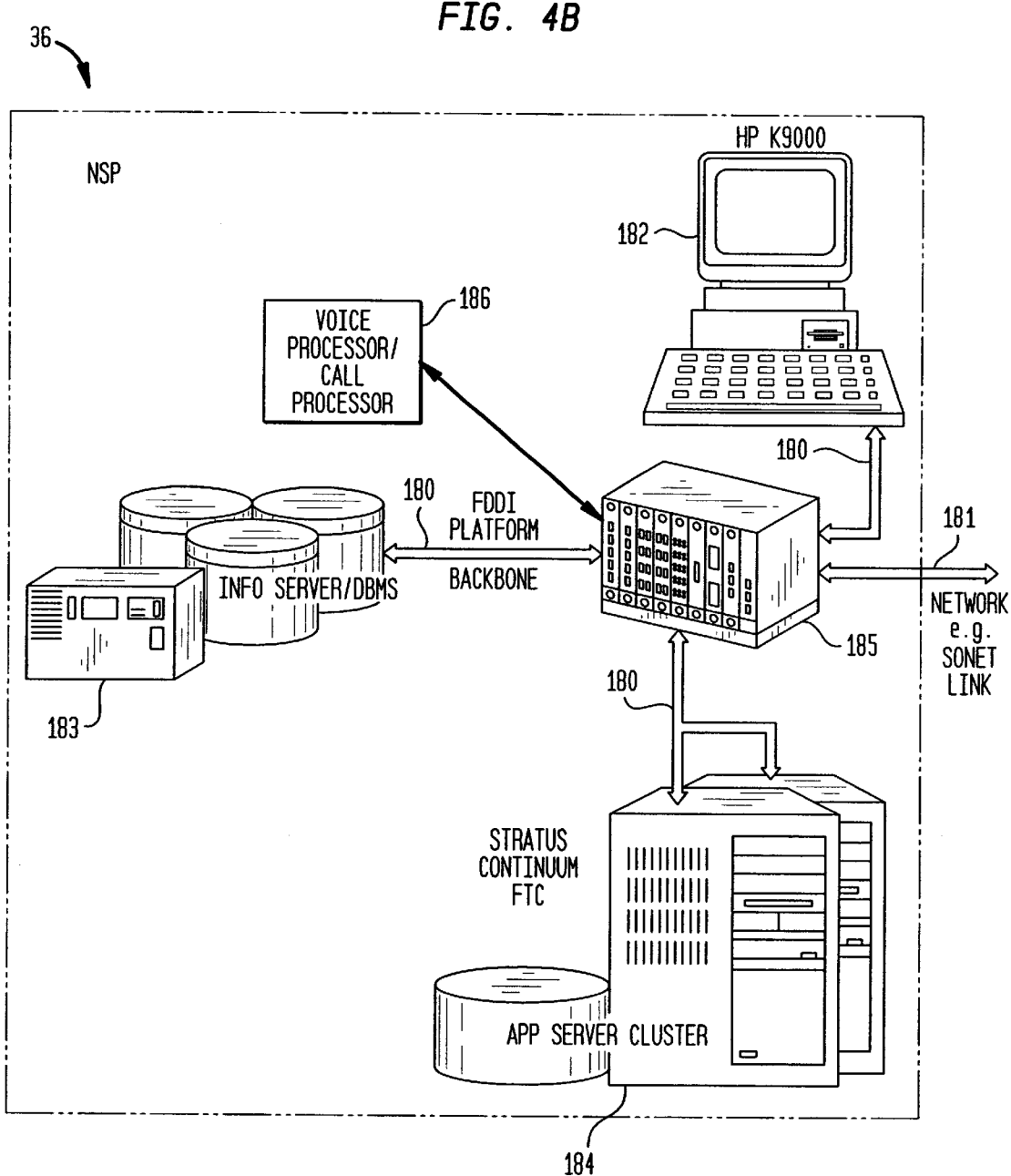
FIG. 4B illustrates a block diagram of an embodiment of a network server platform consistent with the architecture shown in FIG. 1.

Referring to FIG. 4B, the NSP 36 may be variously configured to provide any number of services provided by a server such as information services, Internet services, pay-per-view movie services, data-base services, commercial services, and/or other suitable services. In the embodiment shown in FIG. 4B, the NSP 36 includes a router 185 having a backbone 180 (e.g., a fiber distributed data interface (FDDI) backbone) that interconnects a management server 182, an information/database server 183, and/or one or more application server clusters 184. The NSP 36 may be connected via the router 185 by a link 181 to one or more external networks, NSPs 36, and/or an FMP/C-FMPs 32. The information/data base server 183 may perform storage and/or database functions. The application server cluster 184 may maintain and control the downloading of applets to the ISD/IRG 22. The NSP 36 may also include a voice/call processor 186 configured to handle call and data routing functions, set-up functions, distributed operating system functions, voice recognition functions for spoken commands input from any of the ISD/IRG connected devices as well as other functions.

Again referring to FIG. 2, the ISD/IRG 22 will now be explained in more detail. The ISD/IRG enables the seamless integration of voice and data across the telephone network. The ISD/IRG 22 utilizes leverages interface and networking innovations originally developed to expedite information retrieval via the World Wide Web. When applied to telecommunications access, these advances enable a revolutionary change in service delivery, that makes the telephone companies network a much more valuable asset than ever before. Coupled with the introduction of low-cost premises devices (e.g., browser based touch-screen phones), the technology enables a natural and compelling link to a rich new class of service offerings and features such as CD quality voice, far more friendly access to a wide range of telephony services (CLASS, conferencing, messaging, emergency services, etc.), new non-traditional services on an AT&T secure intranet such as Bill payment, Banking, Electronic shopping, Home-based smart card ATM transactions, Electronic coupons, Interactive advertising/Point-casting, Corporate LAN extensions for Work-at-Home, Interactive multimedia telephony, High-speed access to the Internet even without a PC, restaurant ordering, sports ticket ordering, catalogue ordering, mail metering machines, directory services, customer services, rate tables, calling plan options, as well as self provision new services, get credit for wrong number calls, vastly reducing the number of service representatives required.

The ISD/IRG 22 performs intelligent multiplexing, dynamic bandwidth allocation, and routing of voice and data and may also include advance signal processing for enabling voice activated commands. It may be possible to give the video phone of FIG. 3A away for free so that all house-holds regardless of income level or desire to purchase a personal computer will have access to the vast information resources of the Internet, an interexchange carrier's such as AT&T's networks, and/or third party networks including those providing pay per view (PPV) movie content and broadcast networks. It is anticipated that the video phone concept together with the ISD/IRG, FMP/C-FMP, and NSP of the present invention will revolutionize the delivery of telephony services and provide a quantum leap in the paradigm of telecommunications, improving the quality of life of interexchange carrier customers while turning the copper loop or the coaxial cable drop into their homes into an increasing necessity for all users.

For high end residential consumers who want more convenience and simplicity in their daily lives and convenient access to more information devices coupled to the ISD/IRG provide, for example: easier delivery of a wider range of telephony services (e.g., customer care, marketing, operator services) with cost savings due to automation; new service opportunities such as interactive electronic catalog shopping from the home, and advertising; ability to offer ultra fast Internet access to every household, penetrating even those without a PC unlike traditional voice/touch tone telephony access; high fidelity voice and music; touch screen and/or voice activated customer interface; asymmetric high speed transport of data to the home with the asymmetric character of the link and apportionment of that bandwidth variable depending on the amount of traffic; new service opportunities such as 3rd party bill payment including paper-less bill payment, banking, obtaining smart card cash in an ATM transactions, electronic shopping from the home, electronic coupons, advertising, electronic review and payment of bills, calling plans, class of services, as well as other services and plans; Interactive video teleconferencing; state-of-the-art networking for Work-at-Home; private line services; Call Connection including the self scheduling of conference calls without the need for an operator as well as initiation of interactive calls with white board augmentation using an appropriate applet downloaded from the NSP; class services invoked, for example, via icons and prompts in a natural manner without requiring memorization of numerical codes; navigation & access for voice, e-mail, and fax messages; obtain operator services without an operator, credit for wrong number, rate table, etc.; define profile for pointcast services; purchase products advertised on TV via synchronized ordering screen with television or PPV shows; Multimedia Enhanced Voice Calls, interactive voice & data response applications & info- on-demand; Support for work-at-home via virtual WAN; Screen pops for message/call alerting; graphical call management using touch and/or a mouse interface, including, for example call setup/bridging capabilities and point-and-click/tap-and-drag conferencing graphical use interfaces to initiate POTS calls, personal registry, mobility manager, call scheduling, call me back standard messages, personal assistant; Universal Multimedia Mailbox including a common interface for fax, voice, text, audio, and/or audio/visual images; 7 kHz high fidelity voice; asymmetric high speed transport with dynamic bandwidth allocation; residential LAN interface and associated local area network within the home; interactive video teleconferencing, display of web pages for customers placed on-hold, and other applications as discussed herein.

The service in accordance with aspects of the present invention makes the phone or coaxial cable TV lines a conduit for a wide variety of high revenue service offerings,. allows the differentiation of local telephone and long distance telephone services, significantly reduces operation costs, extracts additional performance benefits from the imbedded loop plant, makes maximum use of the existing network infrastructure, and uniquely leverages new technology. Aspects of the present invention will enable a revolutionary change in service delivery, which can greatly improve the quality of people's lives, and make the telephone network a much more valuable asset than ever before. When coupled with the introduction of low-cost premises devices (e.g., touch-screen phones), the technology enables a natural and compelling interface to rich new classes of service offerings for all telephone users regardless of their ability or desire to afford a personal computer or learn. Thus interexchange carriers such as AT&T can reduce the cost of their own billing while making it easier for the customer to pay the bill. Additionally electronic billing services can be offered to other companies.

The ISD/IRG 22 may be physically located on the premises side of the protector block. In exemplary embodiments as shown in FIG. 2, the ISD/IRG 22 terminates the twisted-pair loop or coaxial cable or both facilities either leased from the local exchange carrier or obtained from the cable television service provider on the network side and the premise equipment and associated networks on the premises side. The ISD/IRG 22 may operate to aggregate the diverse traffic from the customer premise equipment onto a single stream for transmission over the loop to the twisted pair or cable Facilities Management Platform (FMP) and to de-multiplex the traffic from the FMP/C-FMP.

Figure 5:
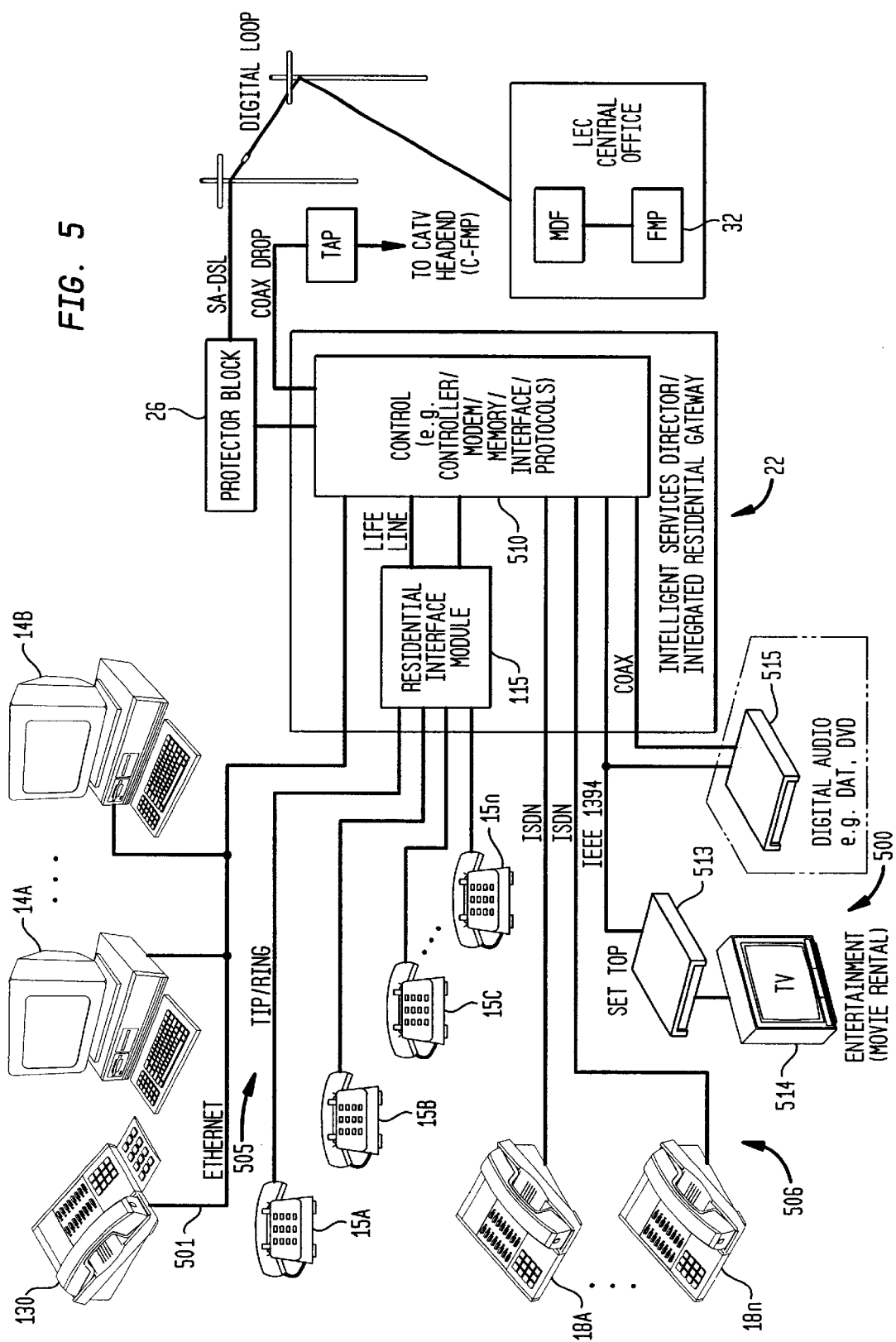
FIG. 5 is a block diagram of an embodiment of the ISD/IRG.

A basic Premises Distribution Network (PDN) 500 for one exemplary embodiment of a typical residential application of the ISD/IRG 22 is shown in FIG. 5. The premise distribution network 500 may include one or more Ethernet connections 500 for connecting a plurality of devices such as a number of personal computers 14A, 14B, a vision phone, cable set top terminal and/or other devices. Further, the premise distribution network 500 may include any number of conventional analog lines 505 (e.g., Tip/Ring (T/R) phone lines), each having one or more associated analog phones (e.g., 15A–15n), and/or associated PCs with modem and/or phone cards. Further, the premises distribution network 500 may include any number of ISDN lines 506, each having any number of digital appliances such as ISDN compliant devices and/or video phones 130. The premises distribution network 500 may use existing twisted pair telephone line, a coaxial cable line and/or may utilize a special cable to facilitate CATV, Ethernet and/or other LAN connections. Where the video phone 130 may share the same LAN as a connected PC 14A, prioritization software in the LAN driver gives priority to video and/or audio transmissions to and from the video phone to reduce latency time and unpredictable delays. Alternatively, the video phone 130 may be coupled via a dedicated ISDN connection, a dedicated ethernet connection, and/or another dedicated connection or coaxial cable connection to the ISD/IRG 22. The video phone may have an integrated analog phone for life line support. Alternatively, one of the analog phones serves the function of providing lifeline support. Further, an Internet telephony phone (not shown) may provide lifeline service via a coaxial drop to the home. Where the video phone 130 includes lifeline support, it is preferred to transmit data to the phone in a band above 7 kHz using ADSL like modem technology.

In exemplary embodiments, the ISD/IRG 22 multiplexes traffic from the various components of the PDN 500 (e.g., Ethernet, Screen Phone, Tip/Ring, ISDN, coaxial house cable) either between other devices on the PDN and/or onto DSL/cable modem 114 for transport over loop twisted pair to the Central Office or coax toward the cable television headend. The DSL/cable modem may be constructed using any of the techniques described in the applications incorporated by reference below. For example, there is some advantage in providing an integrated DSL/cable modem with either twisted pair or coaxial connectors where, for example, central controller capabilities may be shared.

Within the scope of the current document, the term xDSL will be used to represent any member of the DSL family. This family comprises, High Speed Digital Subscriber Line (HDSL), Asymmetric Digital Subscriber Line (ADSL), Symmetrical Digital Subscriber Line (SDSL) and Very high data rate Digital Subscriber Line (VDSL). This list is not limited to the members described herein, since changing technology adds more DSL schemes.

The ISD/IRG 22 may execute any number of additional telephony functions using known techniques such as Packetization of voice for all telephone calls, Tip/Ring Borscht functions, default to Central Office Battery/Tip/Ring to provide lifeline service during power failure, overvoltage Protection, ringing, supervision, answer and incoming call/ringing supervision, generation of call progress tones (e.g., dial tone, busy, ringback, invalid number, etc.), various coding such as 7 KHz G.722 coding for Electra called parties, 3.3. KHz mu-law coding for non-ISD enabled parties, transmit messages reporting DTMF, on hook/off hook/flash hook events, support for voice dialing and enablement of special calling features (e.g., through the use of processor 102 which may include signal co-processor 102A and/or a high performance controller such as the 8960), provision of dial tone with time-out for voice dialing service, coding/forwarding voice commands (e.g., to a voice processor in the FMP/C-FMP and/or NSP.

The data link protocol of the DSL modem may be variously configured to include incorporate Forward Error Correction for traffic unsuited to re-transmission such as voice traffic. Additionally, the data link protocol may organize the aggregate data stream created by multiplexing downstream channels, duplex channels, and maintenance channels together into blocks, attaching an error correction code to each block. The receiver then can correct errors that occur during transmission up to the limits implied by the code and the block length. The data link protocol may also provide sufficient interleaving to correct errors due to impulsive noise but supporting low latency for voice traffic, create superblocks by interleaving data within subblocks to allow the receiver to correct any combination of errors within a specific span of bits. It may be desirable to tailor the interleaving interval to the latency budget for voice applications in DSL modems utilized to carry voice as in the present invention.

The packet handling in the present system may be variously configured. For example, in the CPE-Network direction, the processor 102 may be configured to act as a packet handling subsystem to processes frames from the FMP and to generate DSL frames going to the FMP. The ISD/IRG and the FMP/C-FMP include DSL/cable modems (e.g., TVRC/DOCSIS standard cable) modems to terminate the link layers associated with the DSL or coaxial segment of the connection. In a similar manner as the FMP/C-FMP, the processor in the ISD/IRG may be configured to reconstruct the IPv6 packets from DSL frames and then separates IP packets containing voice from those containing data and from those containing signaling. In the ISD/IRG, speech packets from the Packet Handling subsystem may be delivered to the residential interface for output to one or more analog lines to create virtual phone lines using the upper bandwidth of the DSL modem (e.g., 40 Khz to 1 MHz) in a similar manner as the packet-to-circuit translation subsystem which may be utilized in the FMP/C-FMP. The processor 102 in the ISD/IRG 22 may also be configured to generate signaling packets which may be forwarded to the FMP/C-FMP for later utilization in either an in-band or out-of-band routing subsystem such as a conventional subscriber signaling subsystem (e.g., TR 303). Similarly, the processor 102 in the ISD/IRG 22 may include a subscriber signaling subsystem as part of an external routing subsystem. In this manner, packets received from the FMP/C-FMP in the network-CPE direction (including voice, data, video, and control packets) may be demultiplexed, reformatted with an appropriate protocol, and output to an attached peripheral device connected to the premise distribution network 500.

In the network to CPE direction, the processor 102 may be configured to re-construct IPv6 packets from DSL frames, and separating IP packets containing voice from those containing data from those containing signaling. This process may involve, for example, multiplexing (at the IP packet level) voice, data and subscriber signaling packets bound for a single DSL link with IP packets mapped onto DSL frames.

The processor 102 may also include one or more signal processors 102A and/or voice processor to perform various MPEGII coding/decoding functions, codec functions, voice recognition functions, encryption/decryption, etc. The processor 102 may also be configured to perform various protocol conversion functions such that data having protocols used on a device connected to the premise distribution network may be efficiently transmitted to and from the FMP/C-FMP using an appropriate transmission protocol. Additionally, the processor 102 monitors the devices connected to the premise distribution network and stores information concerning which devices are currently in use. In this manner, where there is an incoming call, the ISD/IRG has the intelligence to know which CPE is in use and which CPE is not in use. As a result, if there is an incoming call, the ISD/IRG will not send a ringing tone to any CPE that is already in use, but will route the call to another device that is available. Further, where there is a choice of a plurality of phones and/or other devices to route the call, the ISD/IRG may review activity detected on the motion sensors on any attached motion sensing devices such as those which may be present in a video phone 130 and ring a phone which is most convenient to the user. As an alternative, all available phones will be rung, with the user given the option to switch between incoming lines.

In an exemplary embodiment shown in FIG. 5, where an incoming call arrives at the ISD/IRG 22, the control 510 rings one or all of the attached phones. Where a user answers a first phone (e.g., 15A), the utilization of this phone is recorded. Thereafter, the user may continue talking on this phone and an off-hook status is indicated. Where another call comes in, the user may choose to answer this call via a conventional method such as "call waiting" and/or using multiple lines. Further, the answering machine (described in an attached application) may be configured to indicate that the user is receiving an incoming call at the moment and provide an on-hold menu as discussed in the applications incorporated by reference below. The control 510 may be configured to have a plurality of calls on-hold and toggle between these calls by depressing a DTMF key and/or the hang-up actuator. Alternatively, a digital phone and/or video phone 130 may have any number of lines with a name, address, and phone number associated with each of the incoming callers. Thus, the residential interface module allows multiple virtual analog phone lines to be multiplexed on a single twisted pair phone line. Further, one of the phone lines may be provided with life line support.

Interconnected to the ISD/IRG may be a protector block 26 (for lightning and overvoltage protection) which is used for impedance matching. The protector block 26 may also act as a demarcation of the customer premise and the local loop transmission network. Copper twisted pair and/or coaxial cable may be utilized to connect the protector block and a CATV headend or a telephone Main Distribution Frame (MDF) as the main transmission medium in the local loop.

The DSL/cable modems shown as 114 may be implemented using a Tethered Virtual Radio Channel (TVRC)/DOCSIS specification cable modem as discussed in the applications incorporated herein by reference. The TVRC (Tethered Virtual Radio Channel) engine may be implemented using a simultaneous voice-data modem which may be a full-duplex Variable Rate—Adaptive Digital Subscriber Line (VR-ADSL) modem. The modem may transmit and receive the modulated voice+data bit stream via the twisted pair. The modem uses discrete multi-tone (DMT) modulation to achieve at least 1.5 Mbps data rate in both directions. Some of the TVRC engine functions include forward error control (Reed Solomon), channel coding (Turbo or Wei Convolution), TVRC spreading, echo cancellation and analog transmit/receive line interfacing. The TVRC modem may be implemented using one or more programmable DSPs which may be utilized to provide the modem transmit FFT and/or receive IFFT engine. However, the embodiments of aspects of the instant invention are not limited to the use of TVRC modulation technology. However, TVRC may be desirable as an alternate to interleaving in order to overcome impairments such as noise and interference and which results in unacceptable delays. (A typical cable modem has already been described above.)

The processor 102 in the ISD/IRG 22 may be configured to discriminate between the various forms of traffic and to route this traffic to an appropriate device. Where high priority voice and/or video is distributed across the interface, the ISD/IRG may include one or more priority queues disposed in the SRAM and/or DRAM 103, 104. There may be different priority queues for each connected device on the premise distribution network (including any attached device described with regard to FIG. 2 or discussed herein). Additionally, there may be different queues for each device in both the transmit and receive direction. Further, control and signaling information may be assigned various levels of priority. A similar queue structure may also be implemented in the FMP/C-FMP. In one exemplary embodiment, the queues give priority to signaling information, and voice information for the various attached telephones. If a queue is in danger of overflow, flow control mechanisms may be utilized by the ISD/IRG and/or FMP/C-FMP. Voice data is accessed first using an appropriate queuing scheme such as priority fair weighted queuing or another suitable scheme. In addition to queuing, bandwidth may be varied so that more DSL frames are assigned to voice and/or video than data. Further, asymmetric DSL protocols may be dynamically implemented such that more bandwidth may be allocated;to one direction or the other as necessary. Where one ISD/IRG 22 is serving as the node for, for example, a seven way conference call, the outgoing bandwidth for the node may need to be increased relative to the incoming bandwidth. However, where a PPV movie and/or Internet file is being downloaded, the bandwidth may be reversed such that more bandwidth is available from the network to the CPE equipment. Thus, asymmetric high speed transport of data to the home with the asymmetric character of the link and apportionment of that bandwidth variable depending on the amount of traffic results in a substantially more flexible platform to implement advanced services to the user. Multiple modem protocols may be downloaded into the DSL modem dynamically to chose the best protocol for a particular dynamic bandwidth allocation to maximize the amount of through put.

Figure 6A:
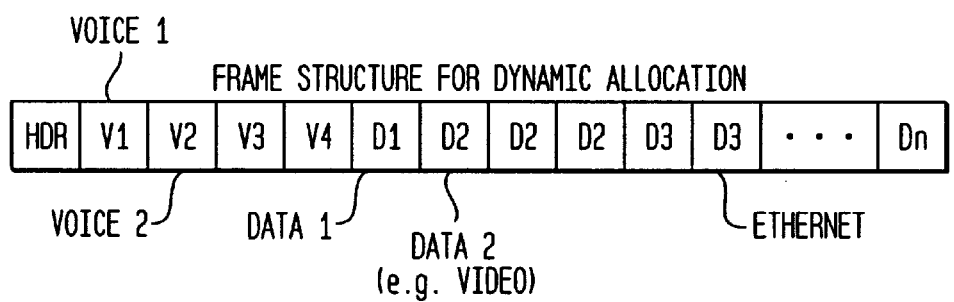
FIGS. 6A and 6B are block diagrams of various frame structures which may be used to communicate between the ISD/IRG and the FMP/C-FMP.
Figure 6B:
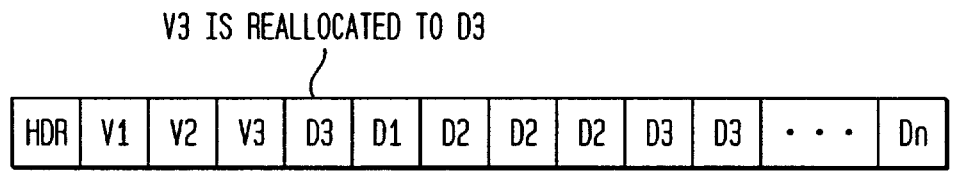

For example, with reference to FIGS. 6A and 6B, information may be multiplexed into one or more DSL frames in order to dynamically allocate bandwidth. In one exemplary embodiment, where data is being input to one of the connected data devices (e.g., a PC), and a voice call comes in, a dynamic allocation of bandwidth may occur. Assume that 1 Mbps is available for information transfer. Prior to the incoming call, all 1 Mbps may be completely used for the data transmission. However, as soon as a voice call comes in, since voice has a higher priority than data, a 64 Kbps channel is deallocated from data usage and is allocated for voice. If a second voice call comes in, then another data channel will be deallocated from data usage and allocated for voice. As a voice call gets terminated, then the allocated voice slots will be reallocated to use by data and/or another voice channel. For example, as shown in FIG. 6B, voice call 4 V4 is terminated and the bandwidth is reallocated to D3.

Accordingly, as the bandwidth is reallocated, the header may be updated to reflect the new bandwidth allocation. This allocation may occur in both the CPE to network traffic and network to CPE traffic. Additionally, as slots are added to CPE to network traffic, slots may be deallocated to network to CPE traffic implementing a dynamic asymmetric bandwidth allocation. Hence, the system dynamically allocates bandwidth in real time to maximize information transfer. Where individual packets are used to transport voice and data between the ISD/IRG 22 and the FMP/C-FMP 32, an individual channel does not need to be allocated. Voice packets are simply given priority over data packets in the transfer. Therefore, silence periods may be used to the advantage and a higher overall bandwidth occurs. Data is simply stored in the buffer and/or slowed in its transfer using standard flow control where voice has priority. In the current system, bandwidth may be. allocated on a per-frame basis. By contrast, conventional systems only allocated bandwidth at the time a secession is initiated—and once initiation has been completed, bandwidth allocation cannot be changed without tearing down the call. However, in aspects of the present invention, bursty data may be accommodated more efficiently since the burst data rate may be accommodated via dynamic bandwidth allocation.

The DSL/cable modem 114 may be variously configured to supporting transport over 18000 foot loops at following rates exceeding 1 Mbits/second, or coaxial cable or hybrid facilities of any length and may include adapting duplex and downstream bit-rates to the needs of the current traffic such that more bandwidth is provided to the upstream and/or downstream and/or between various devices based on an intelligent bandwidth allocation algorithm. The DSL/cable modem may provide a single-tone DMT mode for low power operation during idle periods to avoid re-synchronization at next service request and enable "always on" functionality. The always on and/or virtually always on functionality allows voice/data calls to be established virtually instantaneously without long delays. The virtually always on functionality allows the channel bandwidth to adapt to the current needs of the system to minimize power consumption, reduce thermal dissipation, and generate less interference. For example, if no device is currently being utilized, only a very low bandwidth channel is required. Accordingly, by reducing the bandwidth available across the loop, it is possible to improve overall performance for other lines.

The DSL/cable modem must share upstream and downstream bandwidth over coaxial or hybrid fiber/coaxial facilities but has the advantage of being able to allocate upstream and downstream demand for services in priority with other coaxial cable subscribers or, if both twisted pair and coaxial facilities are provided, to allocate to one or the other depending on priority.

The present system discloses a local loop architecture that can overcome many of the problems associated with either a twisted pair or coaxial cable architecture alone. Amongst the claimed advantages is the ability to have multiple appearances of a call on a single twisted pair or coaxial cable channel. The architecture also allows data and voice to be mixed and bandwidth can be dynamically allocated in real time.

To illustrate the interaction between the various components of the instant invention, a voice dialing scenario will be described. When a subscriber picks up the telephone and if no digits have been dialed after a specified period of time has elapsed, the ISD/IRG may start digitizing the voice information into 64 Kbps $\mu$-law PCM data. The samples may be interpreted locally using processor 102 and converted into commands, and/or stored in a wave file for later transmission. For example, where the voice commands are saved, they may be subsequently transmitted to the FMP/C-FMP over a signaling channel. On receipt by the FMP/C-FMP, the FMP/C-FMP may either interpret the commands (e.g., using a controller in the controller and multiplexer 84), and/or forward the information to the NSP for further processing. In the NSP, the commands may be interpreted using known voice recognition technology. The NSP may attempt to authenticate the request by ensuring that the subscriber does indeed have a subscription to the voice dialing service. The NSP may then determine the identity of the subscriber by looking at the address in the IP field of the packet. The NSP can therefore interpret the information in the wave files and take the appropriate action.

Figure 7A:
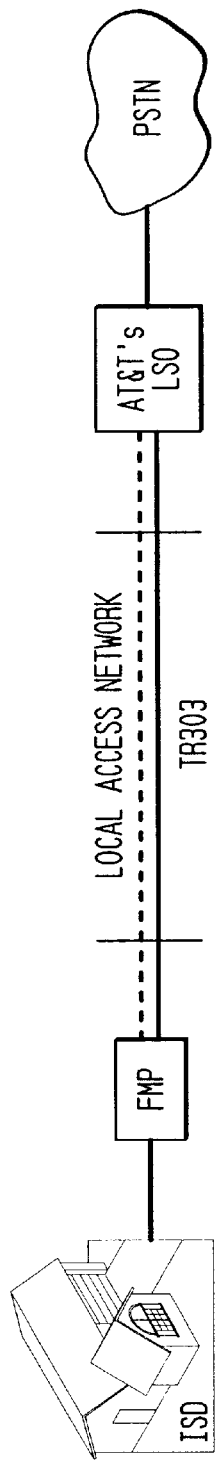
FIG. 7A and 7B are examples of one signaling structure which may be used to initiate a call.
Figure 7B:
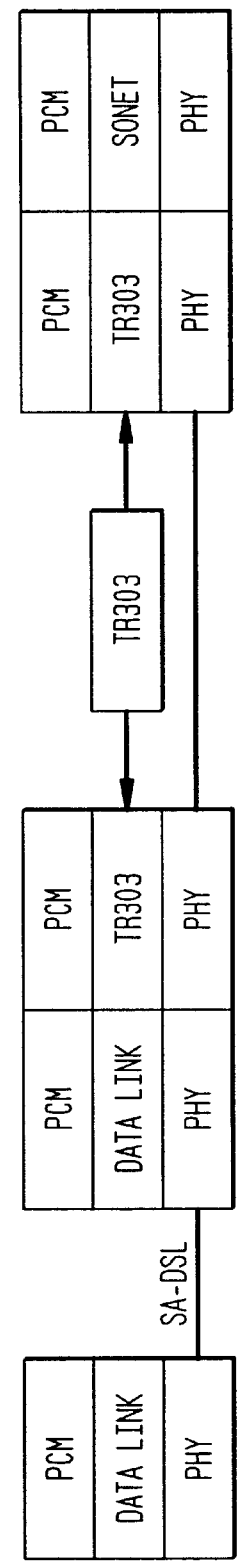

In one illustrative example, assume that subscriber John wanted to call another subscriber Paul. The NSP may attempt to determine who is Paul as defined by John. Once the telephone number for John has been determined, the NSP may inform the FMP/C-FMP to set up a call to John's number. In some configurations, this my be done by the FMP/C-FMP using the TR303 interface (as shown in FIG. 7A and FIG. 7B), for example, by sending a signal to a SLC to request the local Serving Office to tell the latter the appropriate ports to use for setting up the call. The FMP/C-FMP may also include its own DTMF and tone generator for signaling. The inclusion of a DTMF tone generator in the FMP/C-FMP and/or ISD/IRG has significant advantages in that a voice dialing service may be provided by the interexchange companies and there is no need to pay for the Local Exchange Carrier (LEC) for providing such a service. Similar services, such as speed dialing, that the LEC provides can now be made available locally using the ISD/IRG and/or FMP/C-FMP.

In the case where there is an incoming call, say from the PSTN, the FMP/C-FMP may obtain signaling information from the SLC. The information may be dispatched over the signaling channel to the NSP. The NSP may instruct the FMP/C-FMP with information on how the call should be terminated. On receiving this message, the FMP/C-FMP may send the appropriate signaling message to the ISD/IRG. The ISD/IRG may be configured to know which phones are in use and which ones are not. As a result, the ISD/IRG may apply ringing voltage to a phone that is not in use and/or take other remedial action as discussed above, e.g., using a call waiting signal.

The ISD/IRG may be configured to facilitate multiple appearances of calls on a single twisted pair or within a coaxial cable television channel to integrate voice and data traffic. The ISD/IRG is unlike conventional system that uses bandpass filters or splitter to separate voice and data. The ISD/IRG provides a local smart hub interface for all lines in the home as well as providing digital communication coordination among different devices in the home. The ISD/IRG may be configured for various functions including an alarm system, utility meter monitoring, standard POTS phone systems such as tip ring, or multiple tip rings, or multiple tip rings assigned to a single number, and/or multiple tip rings assigned to unique numbers, detection generation and conversion of DTMF tones, ring generation, off hook generation, and other call progress indication, and/or a business interface such as a T1 line, and/or other analog and/or digital lines.

Figure 8:
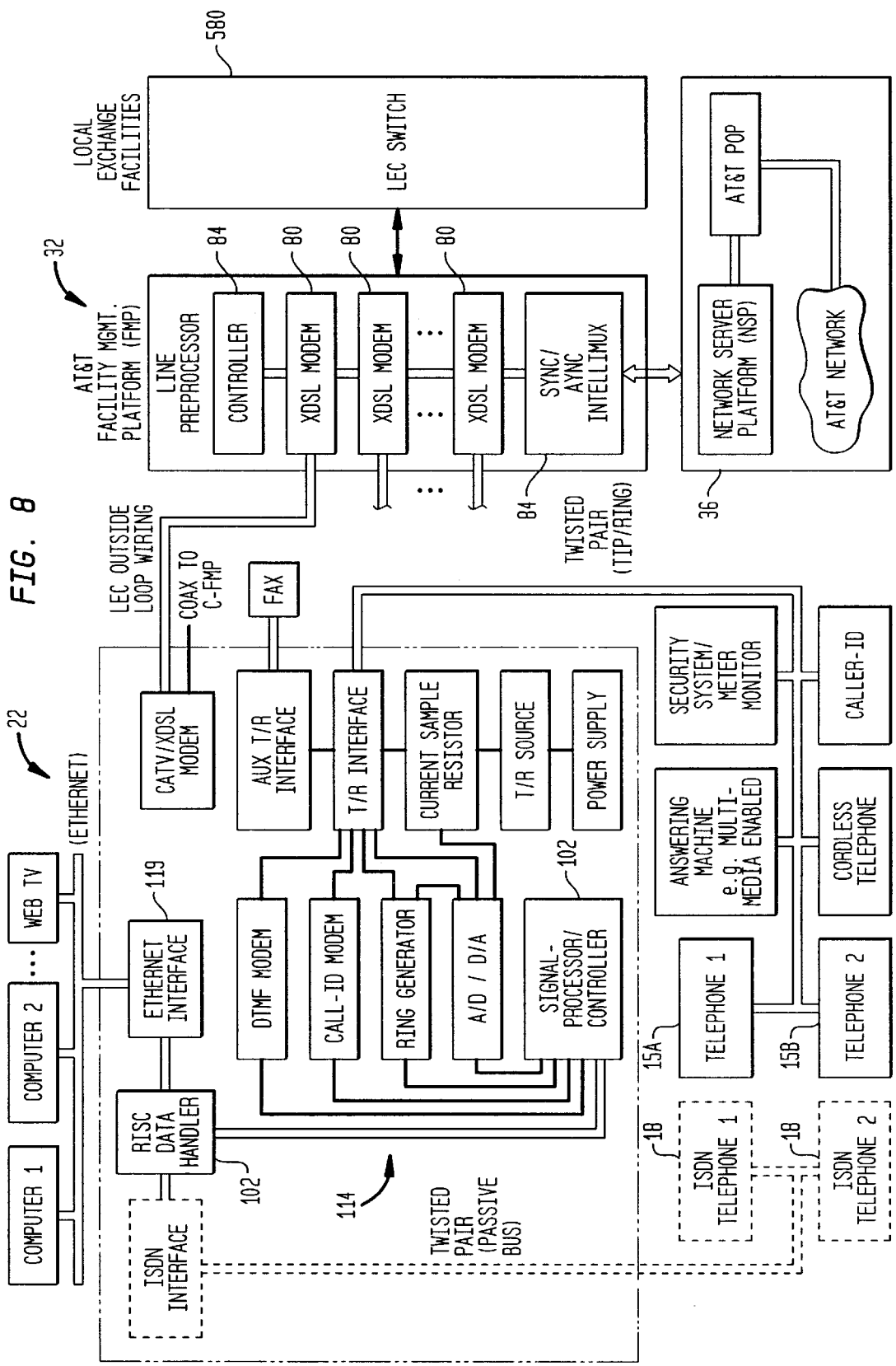
FIGS. 8–10 are various embodiments of the ISD/IRG.
Figure 9:
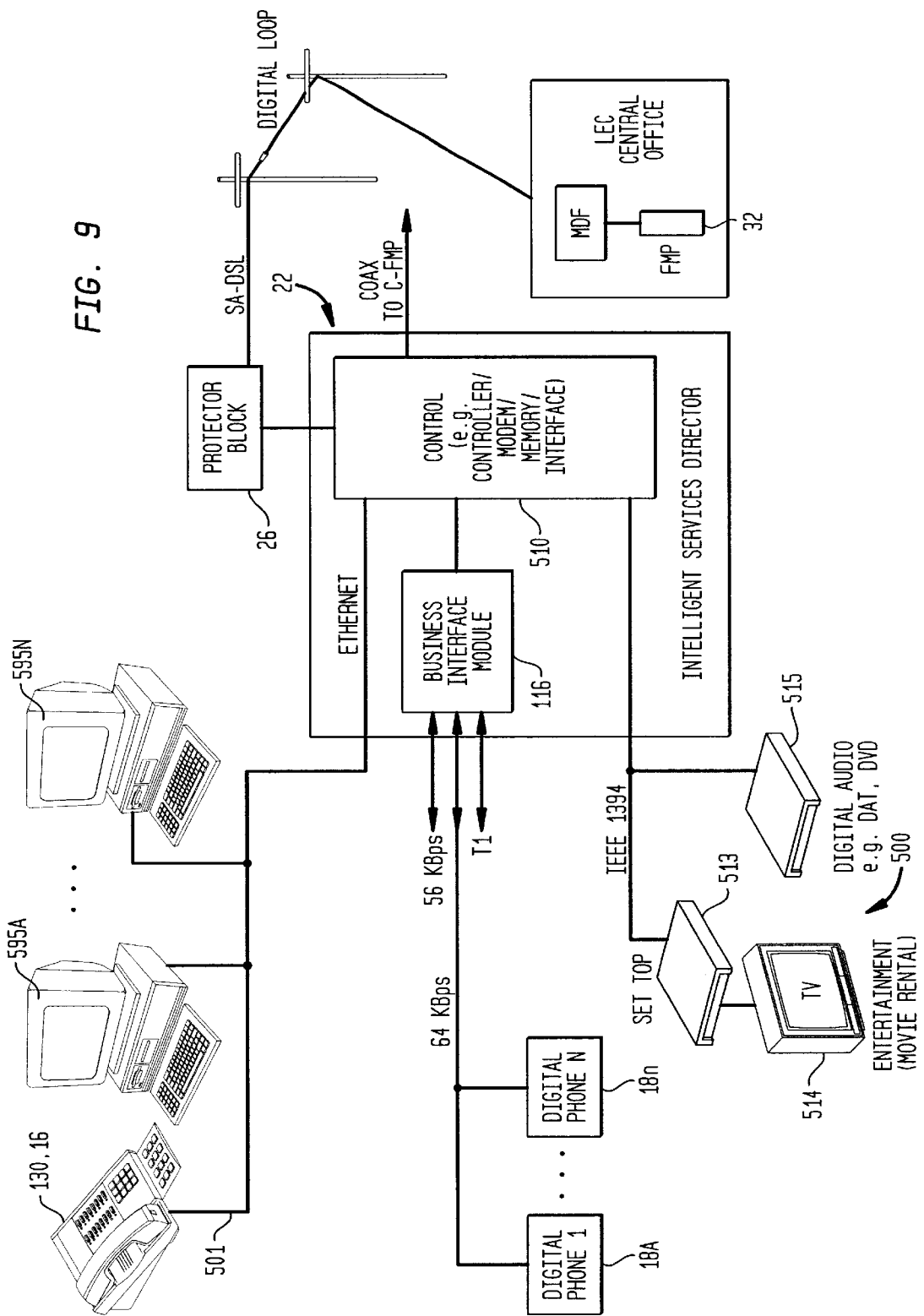
Figure 10:
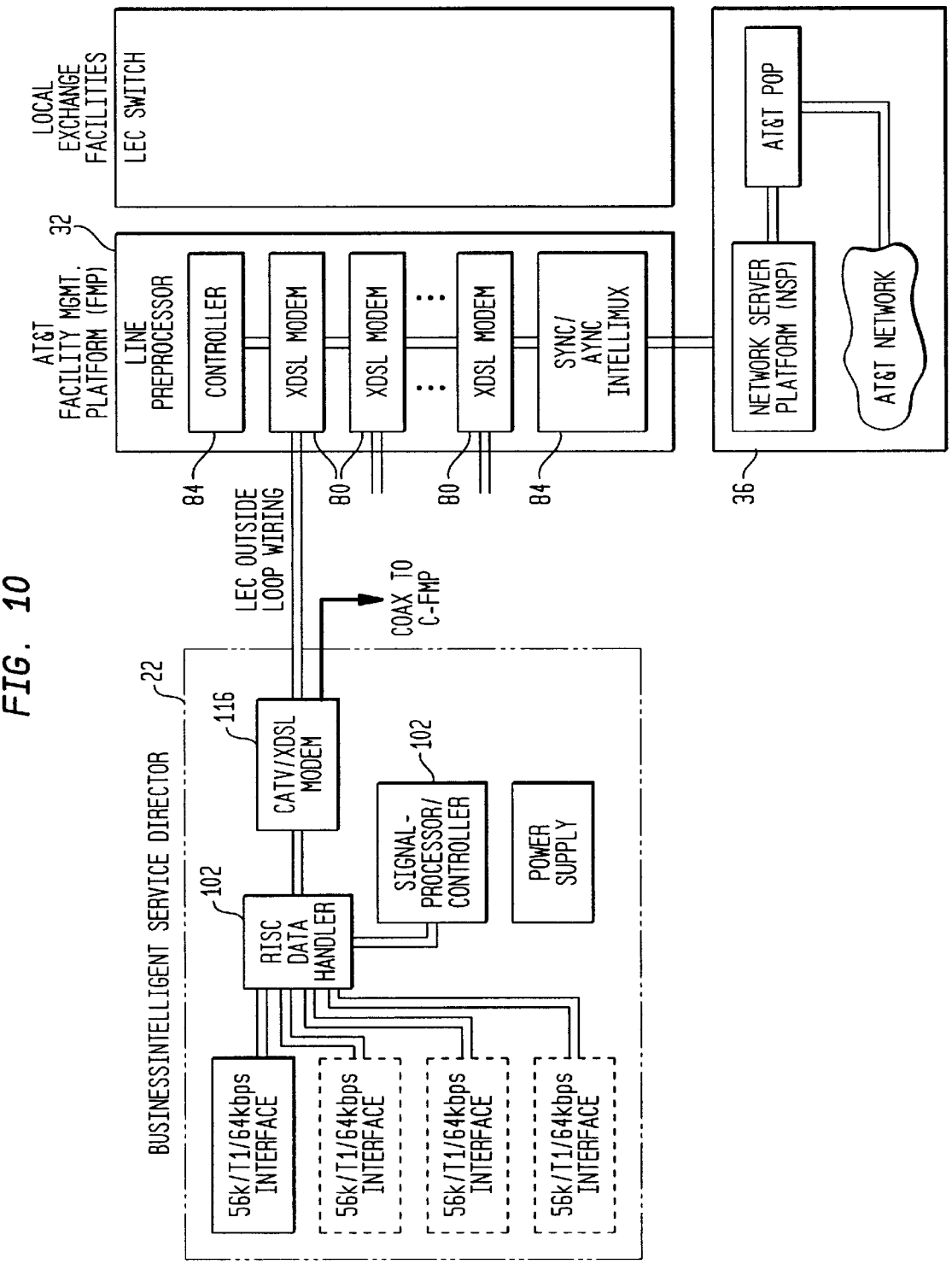

Of course, other embodiments of the ISD/IRG will be apparent to those skilled in the art. For example, as shown in FIGS. 8–10, a second exemplary example of the ISD/IRG is shown.

Further, various implementations of the ISD/IRG may be utilized in different implementations. For example, settop 513 may be coupled to any suitable interface such as the IEEE 1394, RF audio/video interface 120, ethernet interface 119, etc. A TV may be coupled to the settop. Additionally, a DAT, DVD and/or other audio device 515 may be coupled to the ISD/IRG using a suitable interface.

A typical digital set top device comprises a controller, QPSK or QAM transmitters and receivers and MPEG encoding/decoding. The settop device may communicate with a high resolution HDTV television or an NTSC low resolution television or a personal computer or web-TV type device. The set-top may be coupled to high speed Ethernet or to coaxial cable according to the present invention and include features of the ISD/IRG as appropriate.

Figure 11:
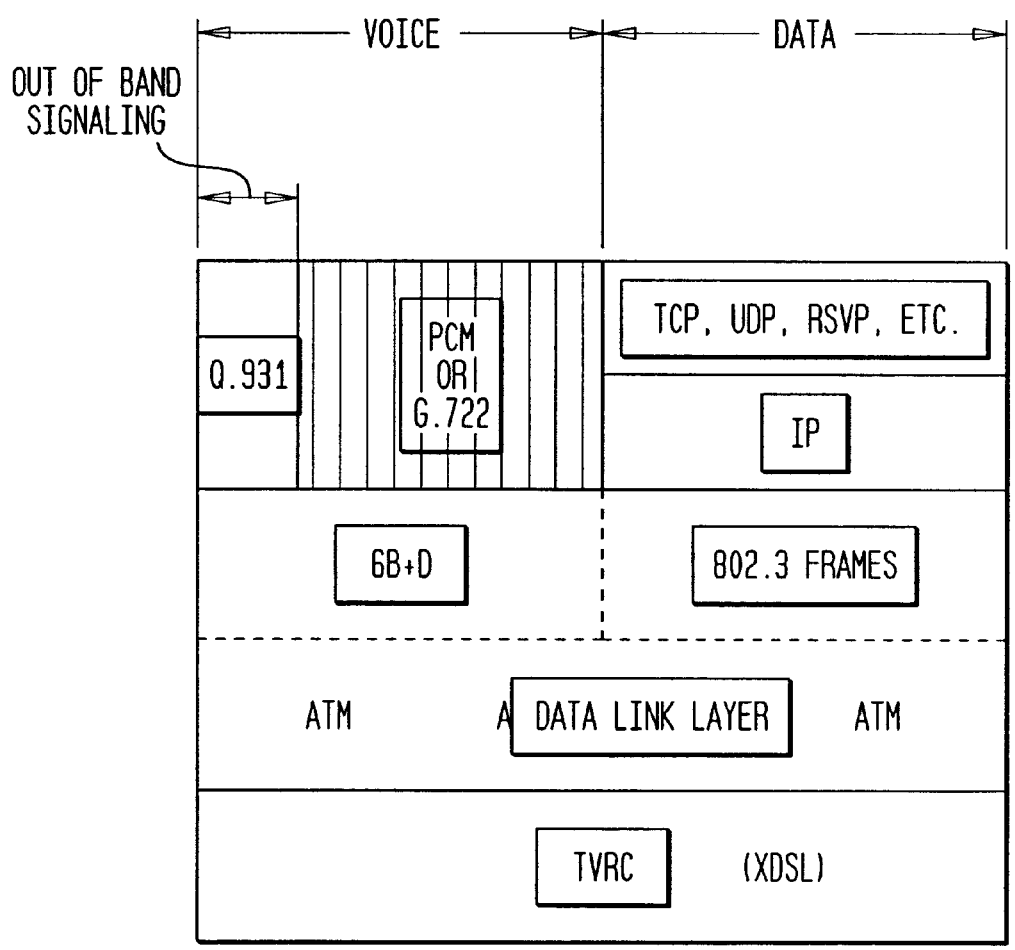
FIG. 11 is an example of one protocol stack for use with the ISD.

Referring to FIG. 11, various protocol stacks may be utilized to transmit the voice and data. For example, a voice signaling stack such as in-band voice over ATM and/or other voice signaling stack may be used. Additionally, a ethernet and/or other IP stack may be utilized.

Figure 12:
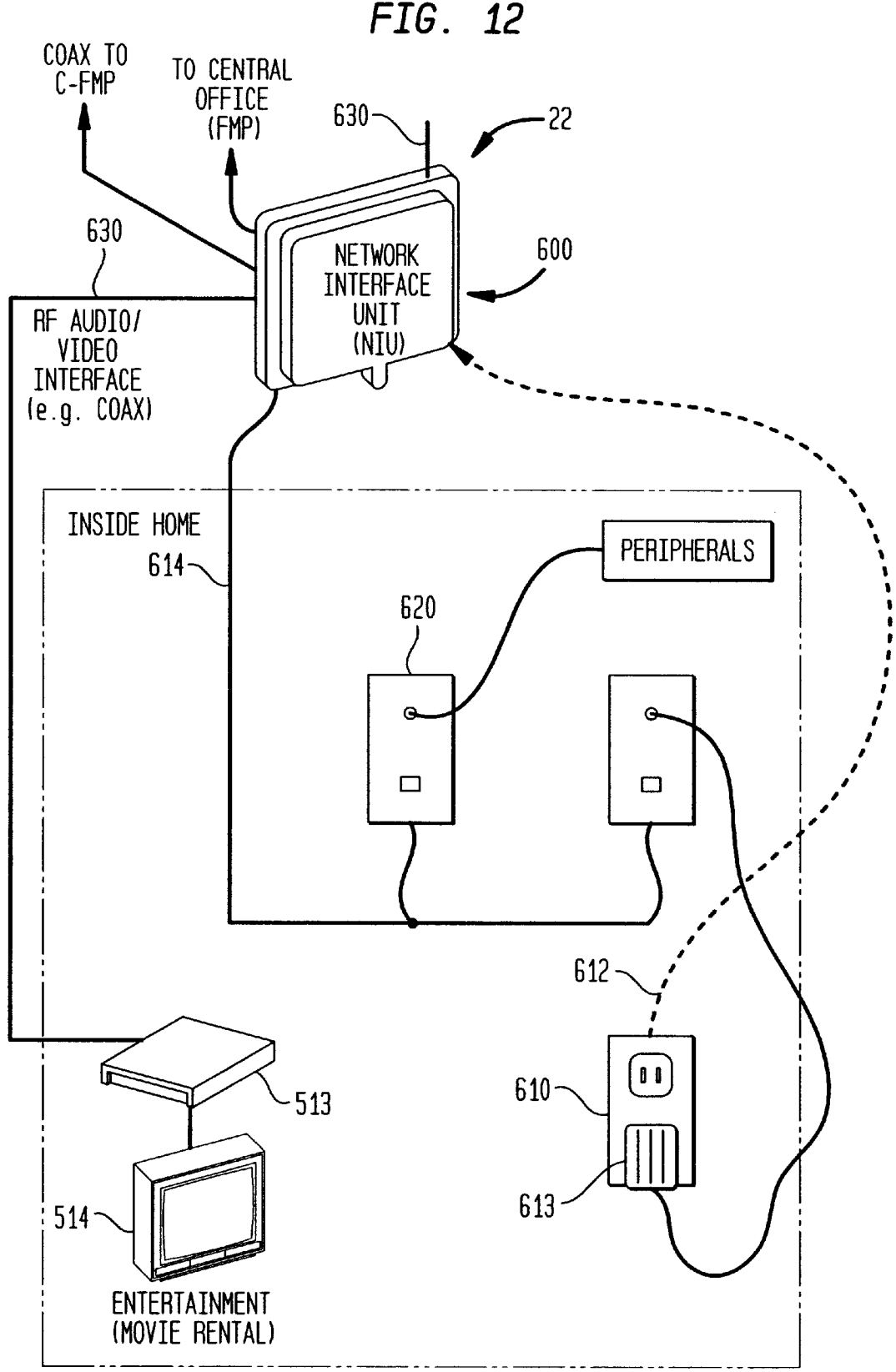
FIG. 12 is a one exemplary embodiment of a form factor for the ISD/IRG.

Referring to FIG. 12, the ISD/IRG may be included in a network interface unit. The network interface unit may be variously mounted either inside and/or outside of the house. Where a DSL/cable modem and/or ISD/IRG is incorporated in the NIU 600, it may be desirable to mount the unit external to the home to allow access for service and to upgrade the ISD/IRG without entering the user's home. Alternatively, the NIU 600 may be provided within the home where power is more readily available and where temperature is more stable. Auxiliary power may be provided via an outlet within the house via a direct power link 612 and/or via a step-down transformer 613 connected to the ISD/IRG 22 via one or more twisted pair phone lines from within the house to outside of the house to the NIU via a spare twisted pair 614. The auxiliary link allows easy retrofit of existing NIUs 600. Phone lines and/or other interface lines may be provided from the ISD/IRG 22 to the house via lines 620 (e.g., twisted pair cabling). The cordless interface 123 of the ISD/IRG 22 may include an antenna 630, e.g., a 900 MHZ or other unlicensed frequency antenna mounted to the exterior of the NIU 600. The antenna 630 may be used as a cellular base station for other wireless devices associated with other customer premises. Further, a cable 630 may be associated with RF audio/video interface 120 in the ISD/IRG 22. The cable 630 may be coupled to a set-top and/or a TV 514.

Figure 13:
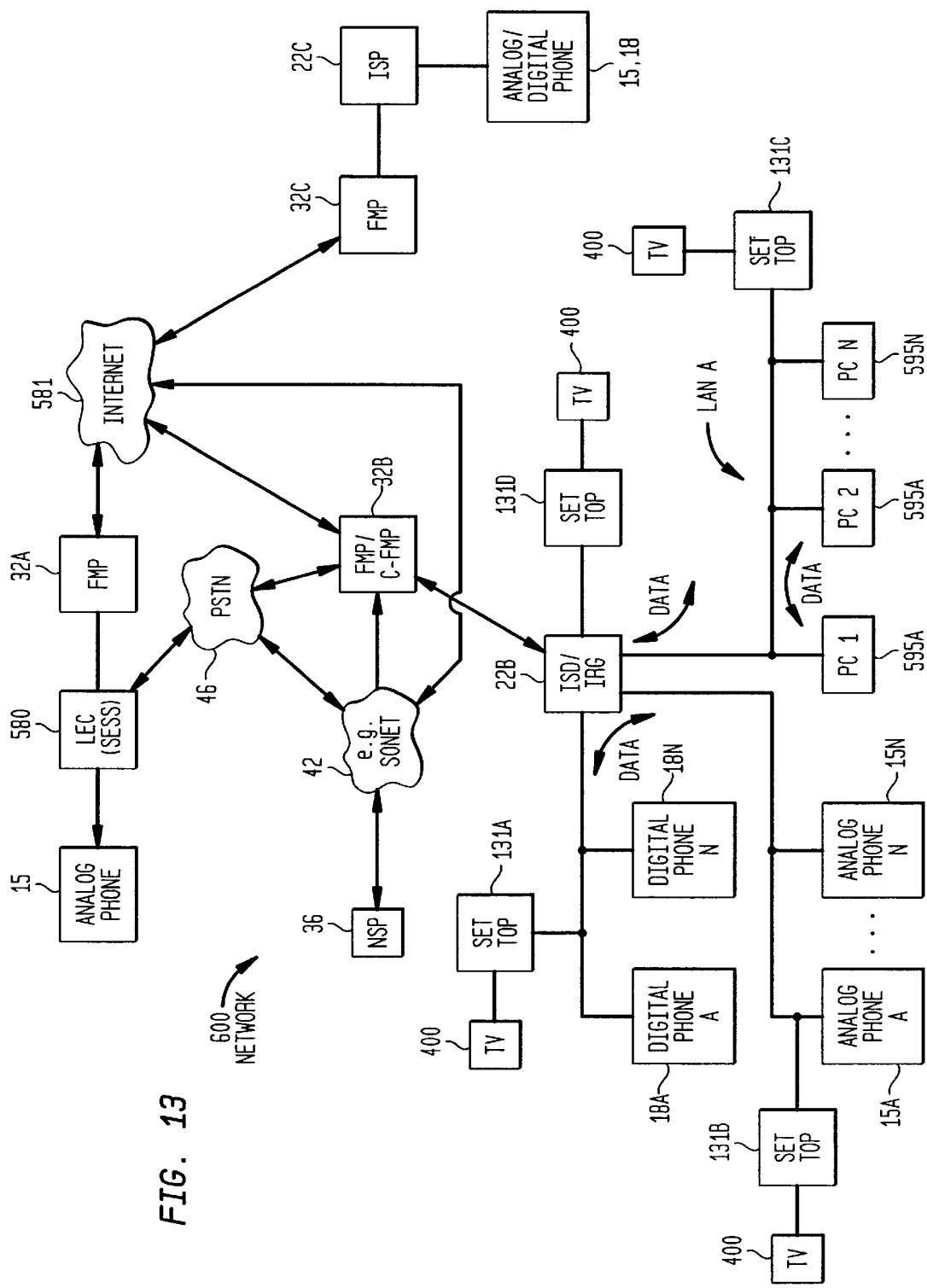
FIG. 13 is an exemplary embodiment of a local house network using the ISD/IRG.

In operation, the ISD/IRG may be variously configured. For example, the ISD/IRG 22 may be utilized as a local house network. For example, referring to FIG. 13, an overall network 600 showing the ISD/IRG functioning in one embodiment of an overall house network. For example, a first ISD/IRG 22B may have associated digital phones 18A–18N, analog phones 15A–15N, and computers (e.g., personal computers) PC 1–PC N. The ISD/IRG 22B may be coupled to a FMP/C-FMP 32B. The FMP/C-FMP 32B may in turn be coupled to a plurality of FMPs 32A, 32C, and one or more networks such as the Internet 581, the PSTN 46, and/or a private network such as a SONET network 42. The FMP/C-FMP 32B may also be interconnected with a NSP 36 as discussed in detail above. The FMP 32A may be connected to a local equipment company's network 580, which may in turn be coupled to the PSTN 46. The LEC network may, for example, comprise a 5ESS switch. The LEC 580 may have a plurality of associated analog 15 and/or digital phones (not shown). Similarly, the FMP 32c may have an associated ISD 22C, coupled to one or more analog and/or digital phones 15, 18.

In operation, the network 600 may include a local area network formed using ISD/IRG 22B as a server. ISD/IRG 22B may act as a server/network controller for local area network LAN A having a plurality of attached PCS. For example, many homes today have a plurality of PCS disposed in different rooms of the house, but not interconnected. By using the ISD/IRG and standard Ethernet software protocol drivers and associated Ethernet cards, the ISD/IRG 22 may function as a network server and/or controller. In this manner, by simply plugging into an existing phone connection, PCS in the house may share date among themselves, among one or more PCS and the Internet 581, between one or more PCS and one of the digital phones 18A–18N (including a video phone). In this manner, the common household problem of how to share information among computers is solved.

Figure 14:
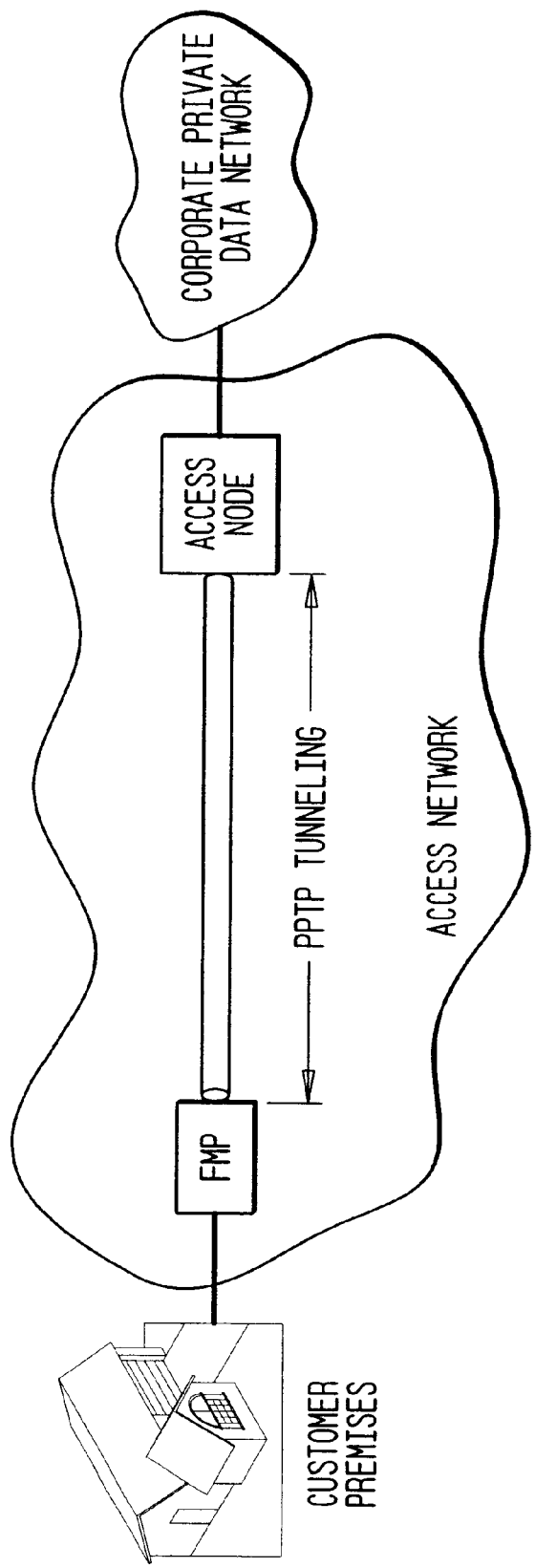
FIGS. 14, 15A, 15B show various implementations of tunneling for use with the ISD.
Figure 15A:
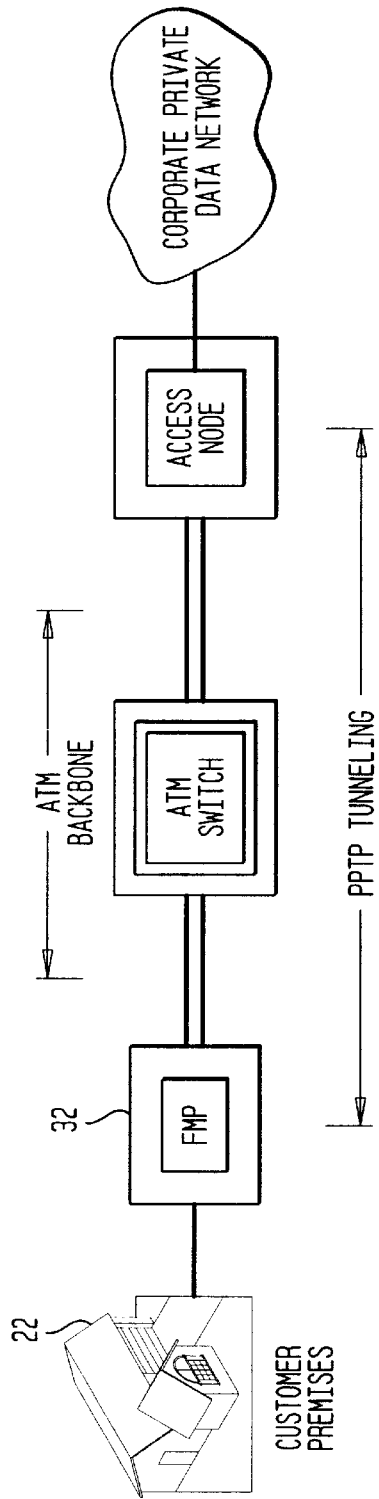
Figure 15B:
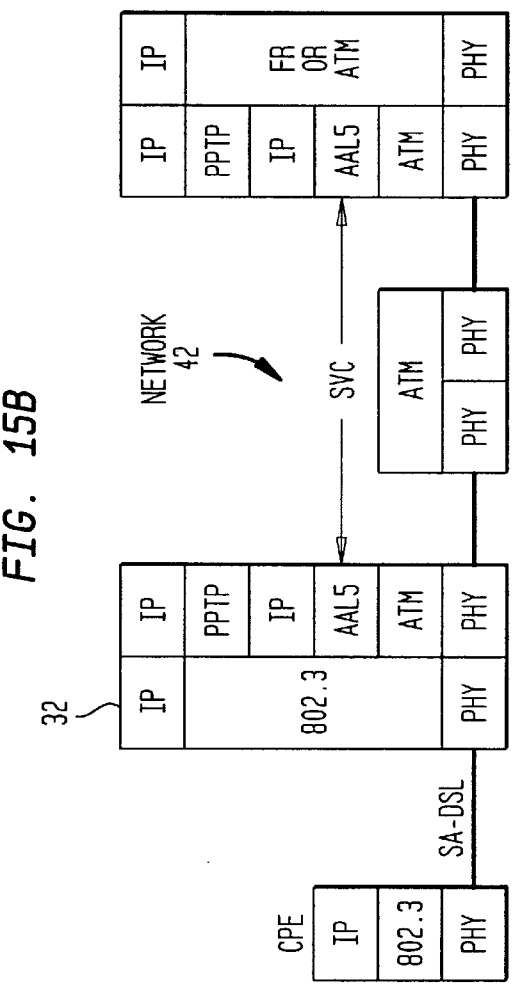

Additionally, the problem of obsolete software is also solved. For example, the ISD/IRG may be configured to download data from the NSP via any suitable protocol such as the use of a proprietary protocol and/or a tunneling protocol (e.g., PPTP) to have direct access to information on the NSP. Tunneling may be implemented using any suitable protocol such as point-to-point protocol shown in FIG. 14, 15A, and 15B. Point-to-point tunneling was developed by Microsoft and may include tunnels wrapping PPP packets in IP layers. PPTP tunneling may be either client initiated or client transparent. As alternative, tunneling may be implemented using layer two forwarding developed by CISCO. Layer two forwarding uses layer two protocols such as frame relay and ATM tunneling to provide a point-to-point connection between a remote caching server such as the NSP 36 and the ISD/IRG 22.

For example, the NSP could host a kids game section which has thousands of different children's programs. The NSP supplied programs may appear as one of a plurality of attached devices to the local home network. A user in the home may execute one of these programs by simply accessing an appropriate icon and/or by installing a driver for the program.

Further, because the ISD/IRG has high bandwidth access to external networks, the ISD/IRG may serve as an Internet gateway. For example, by configuring the ISD/IRG as an Internet gateway server, the ISD/IRG allows every computer in the home high-speed access and E-mail capabilities with the Internet. The LAN may also include inexpensive network computers without expensive disk drives and peripherals allowing the average home owner to purchase many inexpensive network computers, e.g, one for each member of the family. Similarly, WEB TV boxes could use the same LAN network LAN A to obtain high speed access to the Internet. The ISD/IRG may be variously configured as a proxy server, such that each of the devices connected to the UP proxy server may utilize TCP/IP protocol and hence access a single IP connection from the IP server located in the ISD/IRG across the connection to the central office. Where the ISD/IRG is configured as an IP proxy server, the ISD may accommodate any number of additional devices that are not TCP/IP devices or Internet literate. In this manner, the ISD/IRG may have a proprietary interface out to the device, such as the set top box, the personal computer, the digital telephones, the VisionPhone, or other end user devices and yet access the power of the Internet through the ISD/IRG services. So the protocol between the ISD/IRG and the end user devices may be conventional protocols, such as CEBus for meter reading, ISDN for digital telephones and VisionPhones, fire wire, IEEE 1394 for consumer electronic devices such as video DVD players and/or other similar devices.

In addition to the forgoing, the ISD/IRG as a proxy server may be configured to allow an alternate long distance communication path to remote users, bypassing long distance companies networks. For example, where a reduce quality service is acceptable, telephony over Internet may be utilized allowing, for example, analog phone A 15 to communicate with analog phone 15 over the Internet. This may be accomplished by configuring the ISD/IRG to establish certain connections over the Internet either on a continuous basis and/or on a manually enabled basis, for example, using PC 1 and/or vision phone 130. Thus, the user would have the option of communicating with other phone customers without long-distance tolls using telephony over the Internet.

Figure 16:
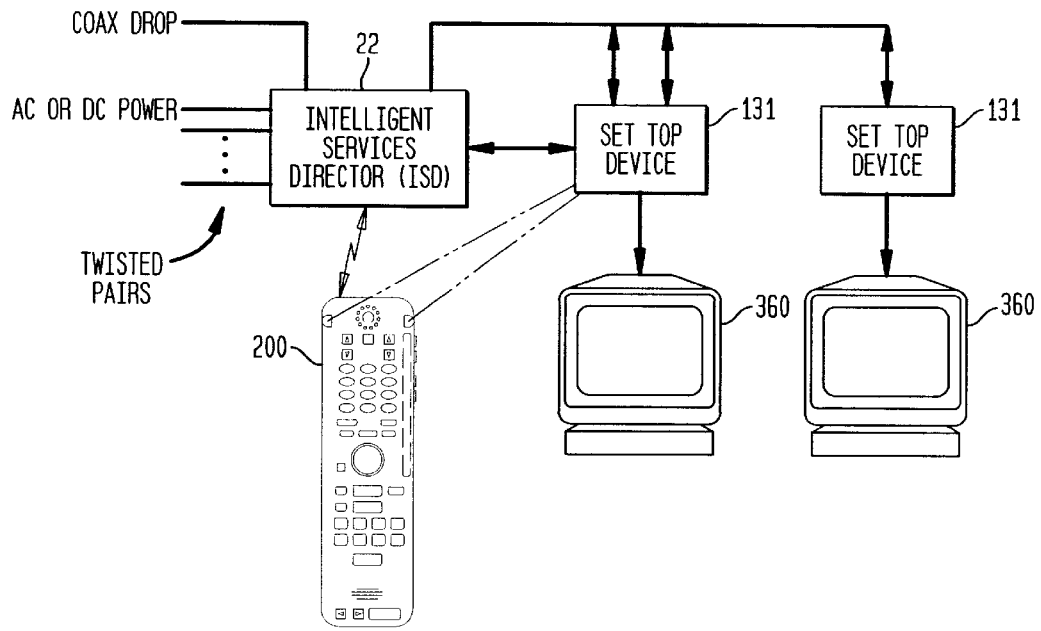
FIG. 16 shows a plurality of ISD/IRG connected settops in a network 500, the ISD/IRG being connected to either or both of a twisted pair or coaxial cable facility.

FIGS. 16–20 depict an integrated remote control and phone according to an embodiment of the present invention. Referring to FIG. 16, the ISD/IRG 22 interfaces with a set-top device 131, which typically is a controller for a television set 360 on which it sits. The ISD/IRG 22 may be powered at 90 V AC fed via the coaxial cable television drop or via 48 V DC power from the twisted pair. The coaxial cable drop and/twisted pairs are shown entering ISD/IRG 22 at the left. The ISD/IRG 22 may be coupled to the set top devices 131 using any suitable interface such as Ethernet interface 119 (FIG. 2), IEEE 1394 interface 112, ISDN interface 113, Business Interface 116, and/or RF audio/video coaxial Interface 120. The ISD/IRG 22 may or may not include an MPEG decoder. In exemplary embodiments, the MPEG decoder may be disposed in set-top 131 to minimize the bandwidth of the ISD/IRG interfaces. Where the MPEG decoder is disposed in the set-top device 131, MPEG packets may be downloaded from the NSP 36, via the network 42, through the FMP/C-FMP 32, through the ISD/IRG 22 and into the settop 131. In exemplary embodiments, video programming is being continuously multicast across network 42 and selectively directed to one or more ISD/IRG devices 22 responsive to a profile input by a viewer and/or responsive to commands by a viewer.

Packets broadcast across a network typically include a program identifier PID. The program identifier, in conjunction with one or more program guide applets may be utilized to select a particular program content from one of a plurality of programs being multicast. For example, the NSP may down load an applet (e.g. a JAVA based applet) for enabling a program guide such as a proprietary program guide or a standard program guide such as that provided by Starsight. The program guide application runs on the set-top(s) 131 and allows the user to select particular programs on which to view. The request is then forwarded to the NSP 36 where it may be logged with any appropriate billing information. The NSP 36 may be configured to include a plurality of program tables mapping PID values and/or values output by the program guide from the settop 131 with identifying information to match the program requested with programs PIDs being broadcast. Thereafter the program is downloaded via the FMP/C-FMP 32 to the ISD/IRG 22 to the settop 131. In this manner a log of requests can be recorded and billing records maintained.

Where a plurality of set-tops 131 are located in the home, each set-top may request different data. Where the CPE is a very long distance from the central office/headend, it may be desirable to have more than one twisted pair connecting the ISD/IRG to the FMP/C-FMP in order to ensure that a plurality of programs will be simultaneously available. One coaxial drop may be provided for downstream services and a twisted pair may be used for upstream services or different spectrum may be allocated in a coaxial facility for downstream and upstream as is known in the art.

As a further embodiment, a user may select a particular program stored on the NSP. Since the output to each home is in a star configuration with the FMP/C-FMP connected to many users, the user may select from a multitude of movies (thousands to unlimited). The movie may either be downloaded in real time to the settop 131 and/or downloaded and stored on a DVD device or other DAT.

In addition to the forgoing, any of the video phone functions and/or set-top functions described herein may operate on the TV under control of the settop and/or ISD/IRG in a similar manner as with the video phone 130. Accordingly, even absent a video phone 130, the settop 131 may be operated in conjunction with the track ball 311 and select key 312 on remote control 200. Thus, the user may select restaurant information, pay bills, select ads, order tickets (e.g., via pop-up windows during commercials for a local sports team which enable the viewer to purchase tickets for a subsequent home game), and/or perform any of the other functions associated with the video phone 130 described herein via remote control.

In addition to the forgoing, where the ISD/IRG 22 is configured as a proxy server, the settop 131 may operate as a WEB TV enabled device. Web pages may be accessed at extremely high rates over the DSL or coaxial cable modem connection giving users a pleasant and easy to use WEB browsing experience.

Figure 17:
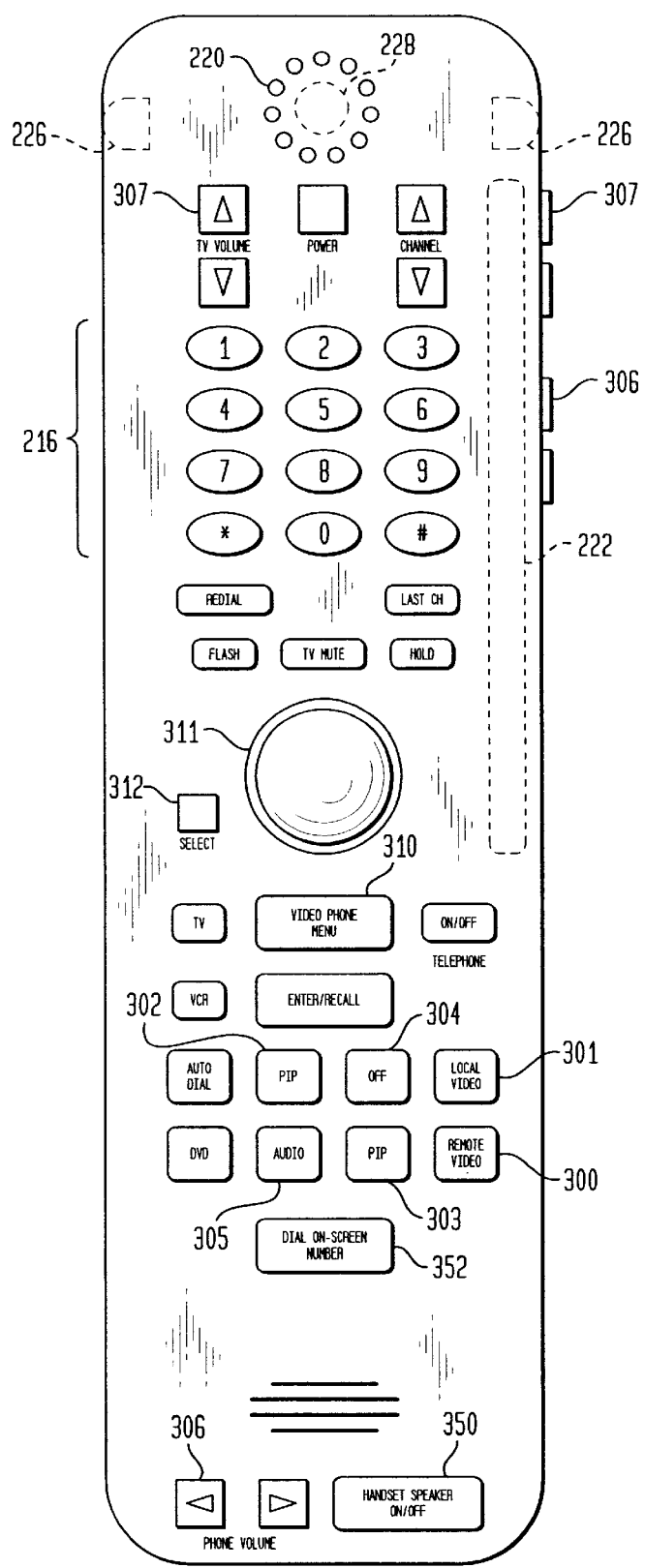
FIGS. 17–18 show a remote control.
Figure 18:
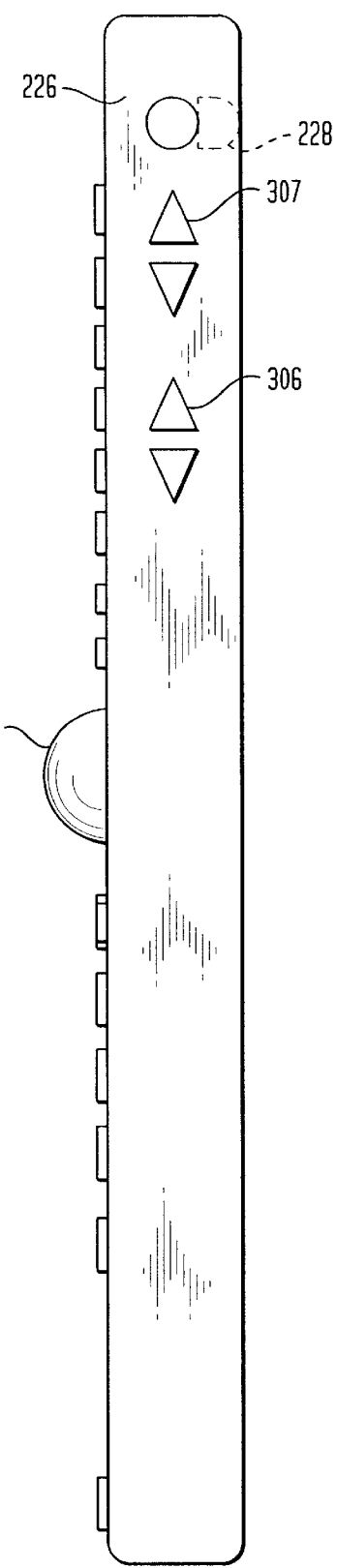

Referring to FIGS. 17 and 18, remote control handset 200 communicates with a television set-top device 131 in a manner that will be described below. It will be recognized that set-top device 131 could be a modified cable television tuner/descrambler and could be located next to the television set 360. It will also be recognized that set-top device 131 could control other video appliances, such as a VCR, DVD, DAT and/or be incorporated into the video appliance which it controls. The set-top device may also be very inexpensive since a tuner is not necessary, only a MPEG decoder and a controller. Accordingly, since the set-top receives ethernet data, the settop may comprise an Ethernet card built into controller 402 as well as an MPEG decoder built into controller 402. Additionally, the RF receiver 410 and/or RF antenna 132 is not necessary where all programming is received via the ISD/IRG. Additionally, where the RF transmitter in the ISD/IRG 22 is utilized, the RF transmitter in the settop is not necessary. Further, it should be understood that the camera in set-top 420 may be optional.

Referring to FIGS. 17 and 18, handset 200 has a case 202 which houses the electronics (FIG. 20) that enable handset 200 to communicate with set-top device 131 via infrared (IR) and/or radio frequency (RF) in a manner that will be described herein. Case 202 has a front face 204, a rear face 206, a top end 208, a bottom end 210, a left side 212, and a right side 214.

Front face 204 may have a user interface comprising control keys for activating various functions. For example, front face 204 may have a standard alphanumeric telephone keypad 216 and ancillary cordless telephone function keys, such as REDIAL, AUTO DIAL, FLASH, HOLD and telephone ON/OFF keys. The alphanumeric keypad 216 may also control video/audio functions in conjunction with ancillary video/audio function keys, such as POWER, volume (VOL ‡), channel (CH‡), last channel swap (LAST CH), and TV MUTE. Other keys may select the device to be controlled, such as TV, VCR, and/or DVD. Additional keys (MENU, ENTER/RECALL, REMOTE VIDEO, AUDIO, LOCAL VIDEO, PIP, OFF) activate certain on-screen programming, adjustment and control functions for telephone usage, video viewing, etc. Further, any of the hot/control buttons, soft keys, and/or touch screens referred to herein may be utilized in conjunction with the TV/remote combination. Also front face 204 may include one or more openings for a microphone 218 and/or a loudspeaker 220 which enable the handset to function as a telephone with the loudspeaker held to the user's ear and the microphone adjacent the user's mouth. The weight of the handset preferably is more or less evenly distributed so that it feels balanced and is comfortable to hold when used as a telephone or as a remote control.

Several of the keys on the handset provide, in conjunction with appropriate software, for example, running in set-top controller 402, and/or controller 102 in the ISD/IRG 22, unique control of the incoming and outgoing (local) video and/or audio components of a telephone call. For example, the VIDEOPHONE MENU key 310 may display on the handset 200 may display any of the videophone menus described in the applications incorporated by reference herein. In place of the disclosed touch screen, the present invention contemplates the use of a track ball 311 or other screen navigation device in conjunction with SELECT key 312 to point to and activate various virtual "buttons" that are displayed on the screen to form a graphical user interface. Phone services accessed by the phone menus may include caller ID, speed dials, etc. The REMOTE VIDEO key 300 displays/removes the remote caller's video image on the television screen, while the LOCAL VIDEO key 301 displays/removes the local caller's video image on the television screen. Further, picture-in-picture or PIP keys 302, 303 for the remote and local video images enable the local caller to view himself, the remote caller or both, or even display one or both callers along with video programming from another source such as the set-top device 131. An OFF key 304 electronically disables and/or mechanically shutters the local caller's video camera (which may be located, e.g., on top of the television set) so that the local caller can decide whether he should be seen by the remote caller. A DIAL ON-SCREEN NUMBER button is provided for expeditiously dialing a number displayed during an advertisement or possibly through an on-screen directory service. In accordance with the invention, a HANDSET SPEAKER ON/OFF button 350 is provided for quick deactivation and activation of the handset speaker and overlay of the voice call audio signal on the video signal sent to the video appliance via set-top device 131.

In the power-saving features, the AUDIO key 305 is associated with the remote caller and allows the local caller to direct the audio portion of the remote caller's signal either to the handset loudspeaker 220 or to the speaker system of the video appliance 360 for amplification and broadcast over the television speaker or remote speakers. Where the audio is broadcast over the television speaker, the phone audio volume may be controlled via phone volume controls 306. Thus, the phone audio may be overlaid over the TV audio output with the relative volume or muting of each controlled separately. By using the TV loudspeakers instead of the speaker in the remote control, the battery life in the remote control is conserved. For enhanced ergonomic function, the TV volume control 307 and the phone volume control 306 may be located on the side of the phone (FIG. 8) to allow adjustment of the relative volume of the TV and/or phone audio while talking on the phone. Where surround sound is available, the audio from the phone could be made to come from a different location such as behind the viewer whereas video sound is in front of viewer. Alternatively, the handset may be provided with a controller which will automatically mute or lower the volume of the TV when an incoming call is received or answered.

During use as a telephone, voice and DTMF tone communication through set-top device 131 and/or ISD/IRG 22 may be accomplished via a radio frequency link, preferably at a frequency of 900 MHZ or other unlicensed frequency, by means of an antenna 132 on settop device 131 and/or cordless interface 123 on the ISD/IRG 22, and an antenna 222 which may be completely concealed within case 202. Antenna 222 is located along one side of case 202, and the electronic components within the case are appropriately shielded by a metal clam-shell structure (not shown) to prevent unwanted interference from the radio frequency transmissions. Although it is preferred to completely conceal antenna 222 within case 202, a partially concealed antenna, or an external antenna, could be used instead. Where an external antenna is used, it is desirable to have multiple infrared diode (IRD) ports to prevent the external antenna from interfering with a single IRD port.

While all communication functions could be effected via the radio frequency link or an infrared link, it is preferred that audio/video control and commands be communicated through the infrared link while audio communications and/or commands are carried out via the antenna. Set-top device 131 has an infrared detector 133 on the front of its base which receives infrared signals from any of four infrared emitting diodes 224, 226, 228 on handset 200. These diodes preferably have broad beams and together afford maximum infrared coverage for a hand-held remote control device. The diodes may be located on one, two, three, or four faces at and near the top end of case 202 so they will not be rendered inoperative by being covered by the user's hand, which normally engages the lower half of the handset, or as the user turns.

Conventionally located on the top end 208 of case 202 is an infrared emitting diode 224. When the top of handset 200 is aimed generally at set-top device 131, infrared signals emitted by diode 224 are received by detector 133.

For added versatility and convenience, an infrared emitting diode 226 is located on each side of case 202. Signals emitted by one of these side-mounted diodes are received by detector 133 when the user holds the handset with one side generally facing the set-top device 131, such as when the user is holding the handset to his ear during a telephone conversation, generally facing the television set where the remote caller's video signal may be displayed, and wishes to adjust a. video function. Having a diode on each side of the handset insures infrared communication regardless of which ear is placed adjacent loudspeaker 220. Thus, volume may be adjusted while the user speaks on the phone. One of the side-mounted diodes 226 also may come into play when the handset is held more or less horizontal but the user turns away from the television set while depressing a command key.

Further, an additional infrared emitting diode 228 is located on the rear face 206 of case 202. Signals from this rear-mounted diode are received when the rear of the handset is held generally facing the set-top device 131. This would occur when the user turns his head away from the television set while holding the handset to his ear. It also allows the handset to function when it is held up by the user for easy viewing of the controls on the front face 204.

Handset 200 preferably is powered by a rechargeable battery or power supply 404 (FIG. 8). The battery may be recharged when the handset is not in use by placing it in a mating recharging cradle in set-top device 131 and including a pair of hot contacts which mate with contacts on case 202. Conventional circuitry in set-top device 131 prevents overcharging of the battery. If the set-top device is integrated into the video appliance which it controls, such as a video receiver, a similar recharging cradle could be provided on the top or the side of the appliance housing. Alternatively, or in addition, a remote recharging cradle powered by line current could provide a more convenient charging location for the handset when not in use.

Although handset 200 is illustrated as generally flat and rectangular in shape, it may take any form as long as it is convenient and comfortable to use as described. The handset could, for example, be ergonomically contoured to more closely fit the hand and the side of the head, e.g. with a curved dumbbell face.

Figure 19:
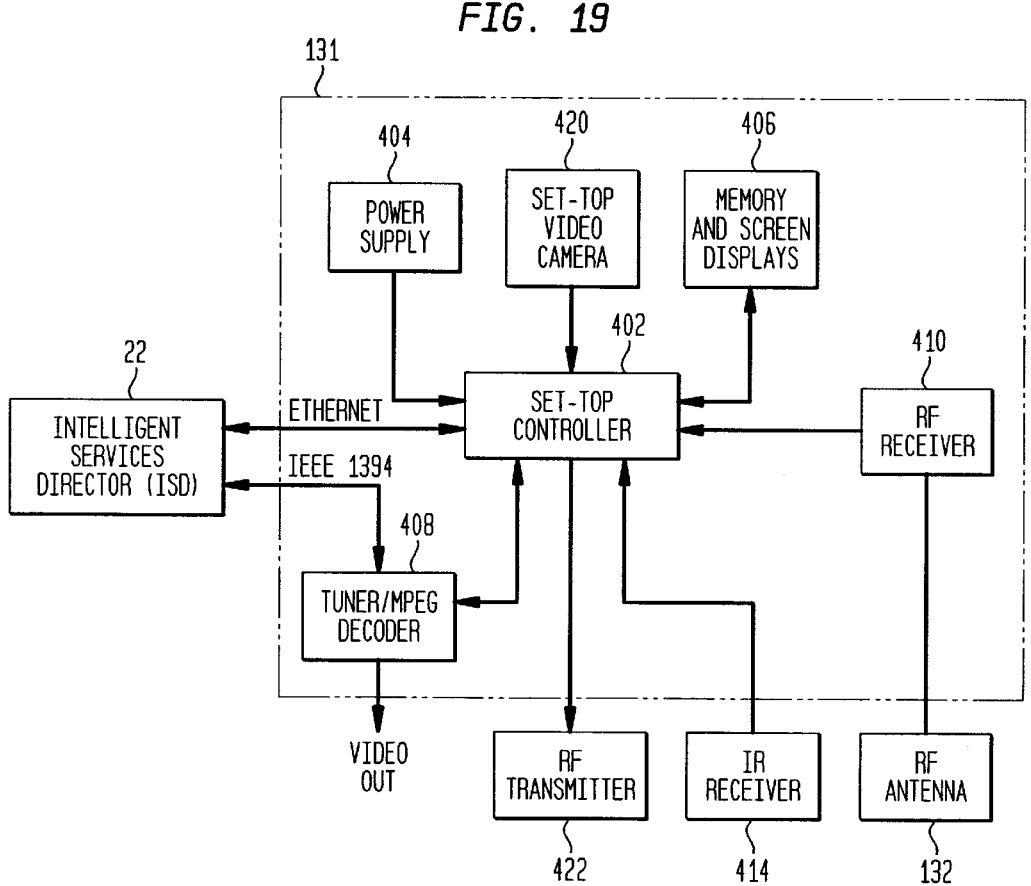
FIG. 19 shows an exemplary architecture of an settop.
Figure 20:
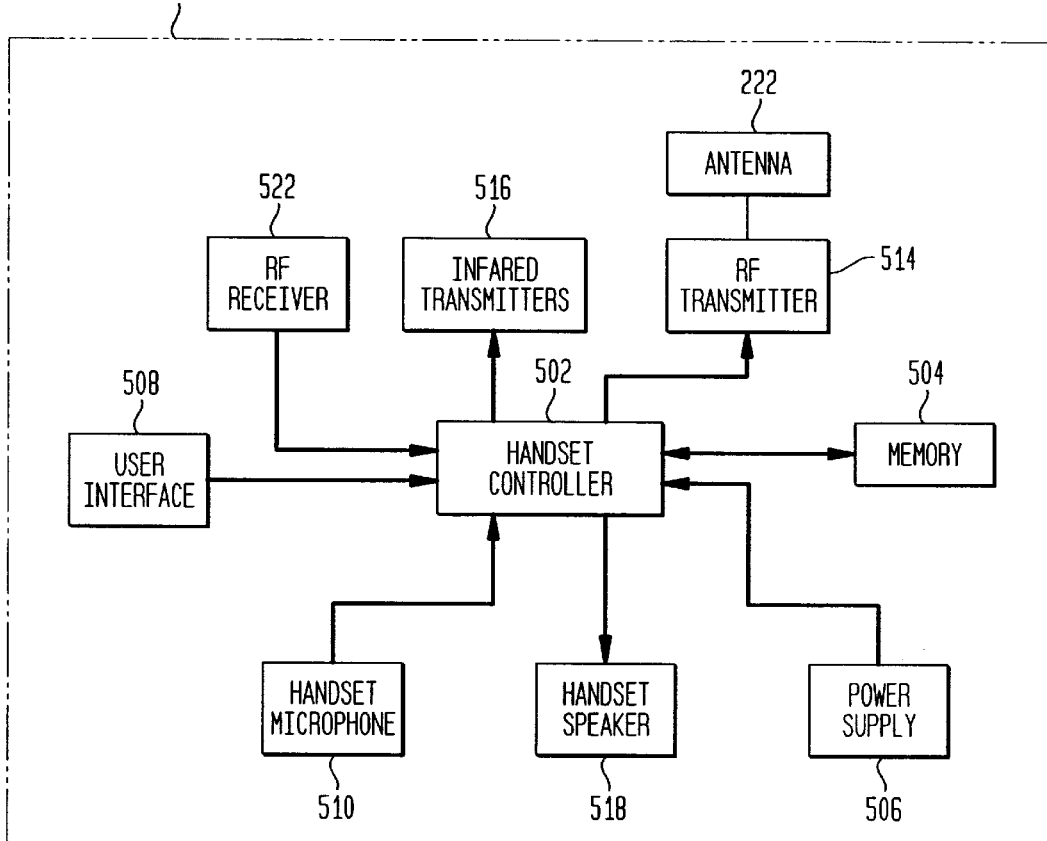
FIG. 20 shows an exemplary architecture of a remote control.
Figure 21:
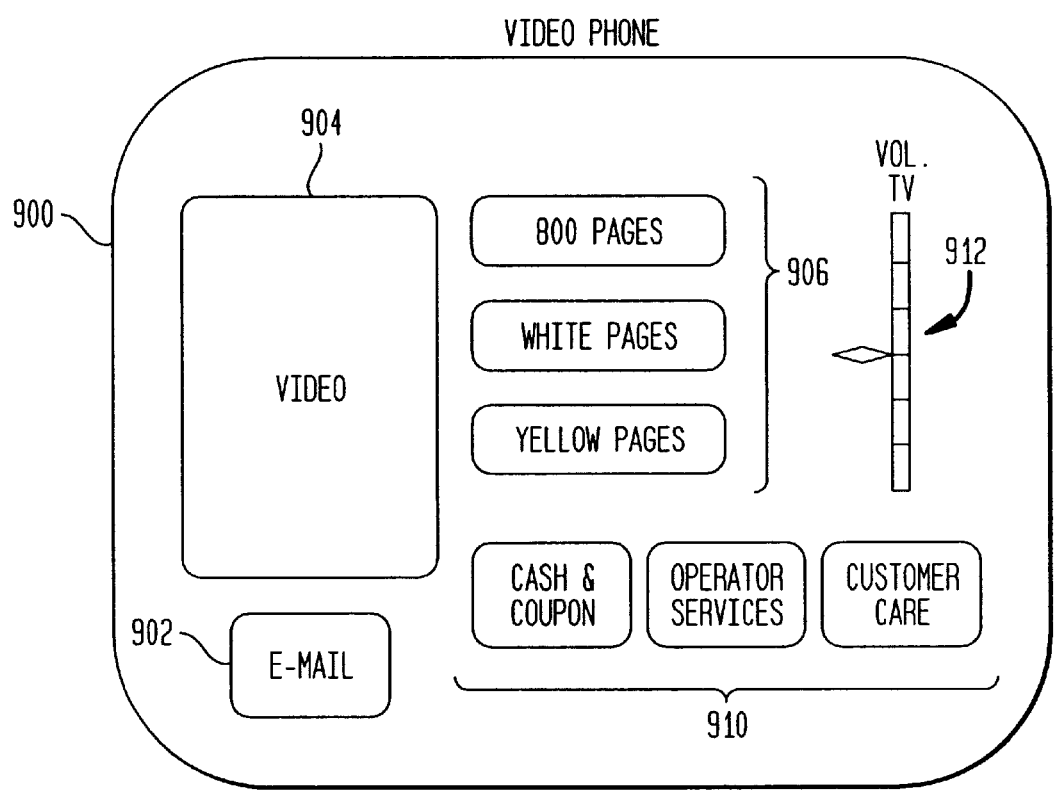
FIGS. 21–24 show exemplary architectures of video screens output by a settop.
Figure 22:
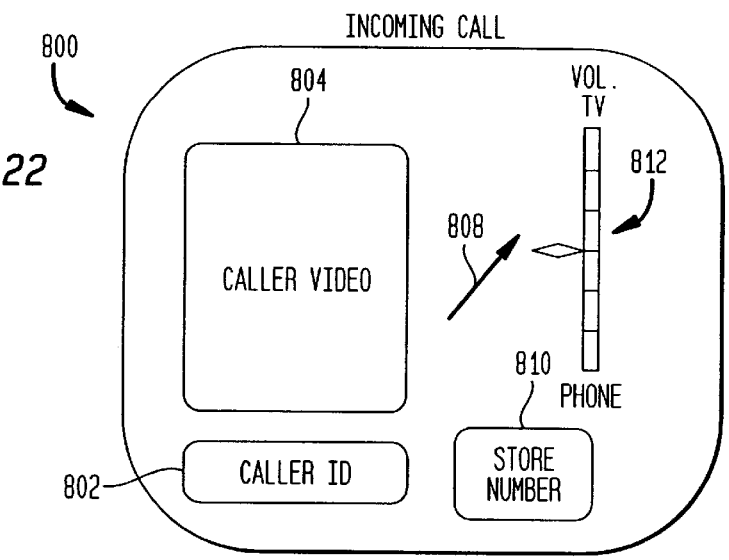
Figure 23:
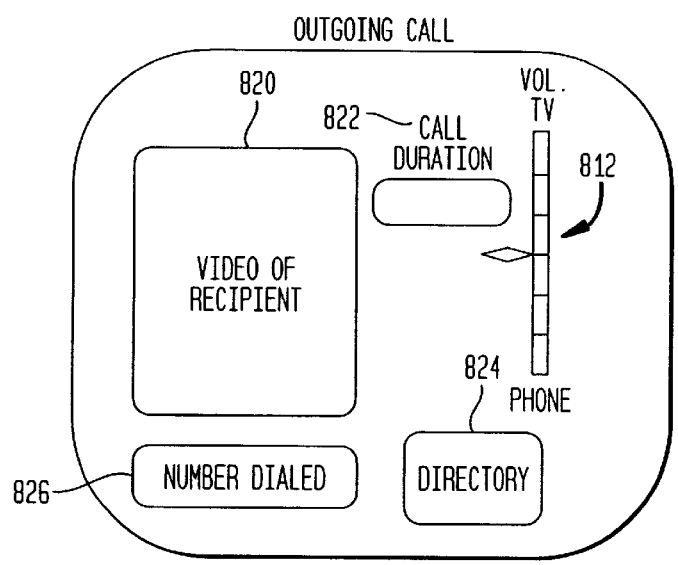
Figure 24:
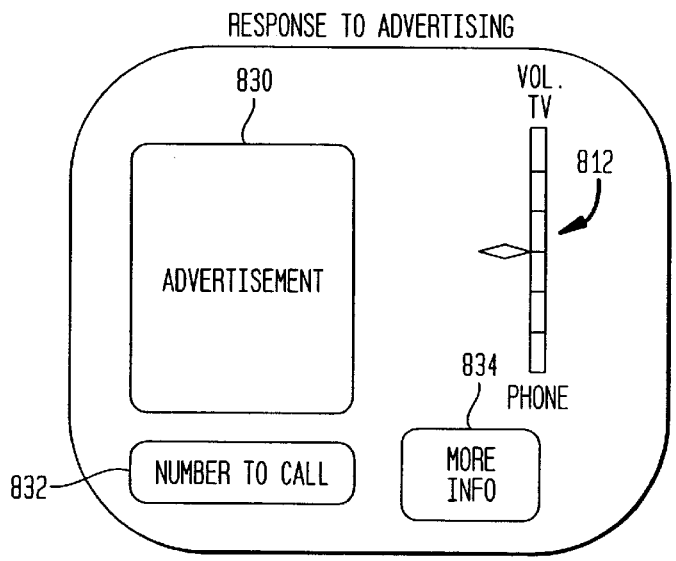

Referring now to FIGS. 19–20, the architecture of the integrated remote control and telephone and the set-top device 131 are schematically depicted. Set-top device 131 includes a set-top controller 402, which may be a microprocessor-based control unit for executing a series of instructions stored in memory unit 406. Information corresponding to various screen displays associated with the video phone interface may also be stored in memory unit 406. Controller 402 is powered by power supply 404 which is preferably a transformer for providing the voltages necessary to operate controller 402 from standard household current.

RF receiver 410 receives a signal, which corresponds to the voice and DTMF tone communication transmitted from handset 200 and provides a corresponding signal to set-top controller 402. RF antenna enhances signal reception of RF receiver 410. Local video is provided via video camera 420 which may be housed within set-top device 131 or, alternatively, installed as a separate device with a video feed to a port (not shown) in set-top box 131. IR receiver 414 receives an IR signal, which corresponds to audio/video control and commands, from handset 200 and provides a corresponding signal to controller 402. Controller interprets the corresponding signal and executes appropriate instructions according to a predetermined instruction set stored in memory 406.

Video broadcast signals are directed via IEEE 1394 link from the ISD to tuner 408 which is controlled by controller 402 and generates a VIDEO OUT signal usable by the video appliance. In accordance with the invention, the VIDEO OUT signal may include an audio signal overlay which corresponds to a caller's voice. The ISD Ethernet link also communicates with controller 402 in order to provide various interactive services described in the applications incorporated herein by reference herein. These services may include the processing of incoming voice and data communications. Incoming voice signals are sent to set-top controller 402 via the ISD Ethernet link. Controller 402 generates a signal to RF transmitter 422 which sends the incoming voice call signal via RF link to the handset. RF receiver 410 and RF transmitter 422 may be appropriately duplexed to prevent the reception by RF receiver 410 of the signals transmitted by RF transmitter 422.

Referring to FIG. 20, the architecture of the handset 200 includes handset controller 502 which is capable of executing instructions stored in memory 504 and writing thereto. A rechargeable power supply 306 provides power to operate controller and all circuitry associated with handset 200. As described above, handset 200 is equipped with at least three infrared transmitters 516 which generate IR-signals corresponding to signals or instructions sent from handset controller 502 for reception by infrared receiver 414 on set-top device 131. Similarly, an RF transmitter is provided for generating RF signals corresponding to the instructions or signals sent by handset controller 502 to RF receiver 410 on set-top device 131.

Telephone signals corresponding to incoming voice calls are received by handset via RF receiver 522 and broadcast to the listener via handset speaker 518. In accordance with the present invention, however, the handset speaker 518 may be deactivated via user interface 508, which, as explained above, includes an AUDIO on/off button 305. Handset controller 502 may be provided with appropriate instructions such that, when AUDIO button 305 is set to deactivate handset speaker 318, or when telephone volume buttons 307 are depressed to reduce the handset speaker volume to zero, the incoming voice call audio signal is no longer broadcast from the set-top device 131 to the handset, but instead is merely overlaid on the video signal sent from set-top device controller 402 to tuner 408. This feature of the invention results in significant energy savings and prolonged life of the handset power supply 506.

The caller's voice signal may originate from the set-top device or from a separate wireless phone base unit, or even from a cellular network. it will be recognized that the invention finds application to each of these wireless telephonic systems. For example, as described in the applications incorporated herein by reference, the caller's voice signal may originate from the same network as the video broadcasts, in which case the caller's voice signal originates from the set-top device 131. In that case, the handset 200 would not require electronic circuitry for relaying the caller's voice signal back to the set-top device when the handset speaker is deactivated. Instead, the handset controller 502 would be adapted merely to transmit a control signal via transmitters 516 to the set-top device 131 such that set-top controller 402 overlays the voice signal. Since the caller's voice signal is already being processed through set-top controller 402, there is no need to relay the caller's voice signal from the handset to the set top device 402. On the other hand, the voice signal may originate from a source other than set-top device 131, such as a separate wireless phone base unit (not shown). In such a case, for the audio signal to ultimately be overlaid on the video signal to the video appliance 360, the handset controller 502 would be adapted to operate handset transmitters 516, or possibly an RF transmitter (not shown), to convey signals recognized as a telephone audio overlay commands by the set-top device controller 402. The controller 502 would also be adapted to subsequently forward the caller's voice signal from the handset 200 to the set-top box 131 via transmitters 516. Thus, the caller's voice signal would be transmitted from the base station to handset 200 via RF or IR link, processed by handset controller 502, and, in response to a user selecting the appropriate control keys on the user interface 508, be relayed to the set-top box using an IR or RF link in response to the user selecting a predetermined volume level for the handset speaker 518. In this manner, the invention may be utilized to conserve energy stored in the handset power supply 506 when it is desired to deactivate the handset speaker 518 and utilize the video appliance speaker to broadcast the caller's voice. It will be recognized that this aspect of the invention is applicable to wireless phone handsets which may or may not incorporate set-top device remote control features.

One telephony/cable television problem being addressed by the present application is the provision of lifeline support for telephoning over a cable distribution system. Referring again to FIG. 1D, the lifeline support may be divided into several sections including a head end section, a distribution network section and the home/customer premises section. Where a lifeline support is provided to a cable system, the power necessary to drive the lifeline devices needs to be provided through the coaxial cable to the home. One option for providing this power and lifeline support is to connect the telephony into a hub 62 of the cable network and only provide lifeline support from the hub 62 downstream through the nodes 61 to the house network. The average power requirement for a two line telephone is 3.1 watts, accordingly, the lifeline power distribution network will require at least 3 watts per household distributed throughout the network. In a typical network there are 20 nodes or less per hub 62 and 500–1000 houses per node 61. In the current system there can be many as 500–1000 houses per node 61 or 3,000 watts per node 61 which may be excessive. Accordingly, it may desirable to drop the number of houses per node 61 to 200 or less making 600 watts per node. The cable system currently uses as a standard component a two-drawer file cabinet size box which is positioned at the base of a pole and has batteries in the bottom of the box and a power supply for converting either 110 or 220 V AC into 90 volts AC for supply out onto the cable network. One solution for lifeline is to use the existing distributed battery backup systems as described above distributed throughout the cable network to provide lifeline power into the home from the batteries in the file cabinet size batteries backup supplies. In this manner, by placing the battery backup supplies downstream from the node and the hub, the node and the hub no longer need to be powered from the head end. Additionally, in this way lifeline support can be provided into the node or the hub with a fixed number of twisted pair of lines which go directly to the local exchange and provide lifeline support on a selected statistical basis.

With regard to FIG. 1D, there are several alternatives for providing lifeline support into the cable system. In a first alternative, the lifeline support is provided to the node 61 where the node is coupled to the FMP/C-FMP through, for example, a DSL twisted pair of lifeline connection. In alternative embodiments, the DSL twisted pair of lifeline connection may be interconnected through a hub 62 or through the head end 63.

The different alternative embodiments between connecting the lifeline support through either the node, the hub or the head end may be influenced by the particular type of distribution facilities that the cable network employs. For example, where a node is employed on a telephone pole it may be a simple matter to connect the twisted pair of DSL lifeline support directly into the node on the telephone pole. However, where the node is buried underground, it may be more difficult to provide lifeline DSL support into each of the individual nodes. In these embodiments, it may be useful to provide the DSL lifeline support into the hub as opposed to into the node. Where the DSL lifeline support is provided into the hub there may also be additional room to provide circuitry within the hub whereas the space requirements within the node are extremely limited because these are often pole-mounted. In yet alternate embodiments, the DSL lifeline support may be provided into the head end, however, providing the lifeline support into the head end often requires that the entire cable distribution network remain powered in the event of a power failure. In yet alternate embodiments in some cities the cables are provided underground in manholes. In this embodiment, either the node, hub or head end connected DSL may be appropriate because the telephone cables are typically co-located with the cables in the manholes and may be interconnected to provide lifeline support. So the foregoing discussion is centered primarily on how to interconnect the phone system lifeline support with the cable network.

The following discussion discusses how to pass power through each of the different components on the cable network. The first discussion will center on the individual tap modules and how to pass power from the node through the individual tap modules to the homes. In each of the individual taps the cable system has power in the cable at 90 volt 60 cycle power which is distributed through the center of the coaxial cable whereas the signal is distributed along the outer edge of the center coaxial cable in a skin effect since the high frequencies are distributed towards the outer edge of the cable. In passing the power through each of the taps, the cable is actually severed at each tap and a circuit board is interconnected between the input and output of the tap allowing for the power to be filtered as well as isolation of each of the individual houses coming off the tap providing the high frequency cable system into the house. In the most preferred embodiments, the face plate may be removed without affecting power for all downstream homes from the tap. In this manner, highly reliable power systems may be utilized to provide continuous power downstream of the tap while the individual components on the tap are being serviced.

The tap is comprised of a series of splitters which simply split the power into each of the individual tap sections. So as a minimum, the tap has to be redesigned such that the tap continually passes power to the house over the tap drop regardless of whether the faceplate is removed through the tap as being serviced. In this manner, the tap may include first and second circuit boards with the first circuit board providing nothing more than a power takeoff and signal takeoff of the main board. Today there exists cable with coax and twisted pair and power leads all within a single cable, some of which also include fiber. Accordingly, in one aspect of the invention, coming out of each of the taps is a specialized cable that includes not only a coaxial connection but also a power connection and/or a twisted pair connection. Commscope is a supplier of customized cable that will allow twisted pair and coax cables to coexist. The options with the tap box for cable or pedestal mounting are as follows: in a first embodiment the tap box would simply have a single printed circuit board having a plurality of connectors on the circuit board and an EMI and hermetic seal, circular seal around each of the connectors so that when the top of the tap box was placed and screwed onto the bottom of the tap box, the hermetic seal would seal each of the coaxial connectors and thus, the top could be removed from the tap box without affecting the printed circuit board disposed therein. In alternate embodiments, the coaxial cable outputs or taps could be located in the back, top or side of the tap box and thus not need to be removed when the faceplate was removed. One advantage of the IP telephony is that the telephone call circuit is not broken just because you removed and replaced the plate or a tap circuit board in a cable distribution network. The IP telephony call will often allow you to break for several seconds to several minutes without actually losing the call.

As an alternate embodiment, a GFI or other ground fault interrupt connector may be located in a tap box or the ISD/IRG to prevent injury to small children or maintenance worker who is unplugging and disconnecting the cable system where power is provided to the home through the tap. If you do get a ground fault interrupt, the next question is how do you reset it. In one embodiment you may have it automatically reset after a period of 5 or 10 minutes. In alternate embodiments you may have to have a technician come out and open the tap or ISD/IRG box and manually reset the ground fault interrupt. In still alternate embodiments the ground fault interrupt could be reset by the user with a selection panel at the ISD/IRG. As an alternate embodiment, it is possible to locate the ISD/IRG device directly in the tap where power is already located. Or the cable may be passed through the ISD/IRG and the tap located where the ISD/IRG would be located. If the ISD/IRG is combined into the tap 60, a single ISD/IRG device can be shared with 3 or 4 houses thus drastically reducing the cost of the ISD/IRG per house. Further, the cable running to each of the individual houses who want to be ISD/IRG enabled, can be a hybrid coaxial/twisted pair cable such as an F59 HEC/3-22 made by Commscope of Hickory, N.C.

In an alternative embodiment, it may be appropriate to migrate the ISD/IRG in the direction of the cable set top terminal 131. This has advantages of providing the services and control of television services in the vicinity of the control of telephony services but assumes that there exists a commonality of facilities (twisted pair and coaxial cable) in the vicinity of the set top terminal.

One of the major problems currently with the return path is that the signal from each of the homes is at vastly different levels. The different levels on the return path signal is due to a number of factors such as differences in the in-home wiring schemes between each of the individual houses, differences in the distance from the tap to the house and differences in the distance from the particular tap the house is connected to the node. Normally, the return path is consolidated at the node and not at each of the individual tap locations. Additionally, where the return path for each of the individual homes is returned at a different frequency, the different frequencies will also have different delays. One manner of alleviating many of these problems is to place the ISD/IRG within the tap. In this manner, when return path signals are sent back to the ISD/IRG, the ISD/IRG has an opportunity to adjust the signal strength and frequency of the return signal such that when the signals arrives at the node they are all approximately the same level and therefore can be multiplexed and returned to the head end in a more efficient manner. The invention also has the advantage in that no; power is required to be supplied to each of the individual houses to power the ISD/IRGs. In this configuration, the power is provided only to the tap and downstream of the taps to the houses is provided simply lifeline support on a twisted pair and the cable is not powered. Thus, there is no need to provide 90 volts or step down 90 volts downstream to the house, thus safety is increased as well as the overall efficiency of the system. Additionally, by having an active tap device, it is possible to packetize all telephone traffic at that point and thus the additional amount of bandwidth is substantially conserved since the IP packets and the voice can be compressed and simply put on the return path with all of the other IP packets from any other house utilizing the return path as well as data.

The voice could be packetized in IP packets just like data and the return path could be indistinguishable between voice and data. Placing the ISD/IRG in the tap also may provide additional efficiency in that the downstream data may be packaged for a single tap location and have the tap thereafter make the distribution between each of the individual houses associated with the tap. In this manner, a greater level of efficiency can be provided over the overall cable network in both the upstream and downstream transmission directions. Another option is to include with the; ISD/IRG and/or individually a separate amplifier in each tap so that the signal is amplified and filtered at each tap on the high frequency cable system. In this way, it is possible to avoid a lot of amplifiers distributed throughout the system.

For multi-dwelling units, it is also possible to use similar concepts. In a multi-dwelling unit, a line is run either from a node or from a tap with a splitter into a multi-dwelling unit then within the multi-dwelling unit there are a plurality of taps located in a patch board in the basement for supplying each of the individual dwelling units. For example, a particular apartment may have an apartment amplifier which brings the signal in off of one tap or a node and amplifies that signal and then redistributes the signal to each of the individual apartments. In this manner, the amplifier may also include a high performance ISD/IRG for supplying PBX and other user services to each of the multi-dwelling units. The high performance ISD/IRG and integrated apartment amplifier, provides the following functionality; cable television service, high speed Internet access, telephony, data services, alarm and monitoring and all of the other services with have in the 49 previous applications. The ISD/IRG in the multi-dwelling unit also provides lifeline support and may include a battery backup. The apartment house can also be wired with the hybrid coax/twisted pair cable such that each of the individual dwelling units gets not only cable television but also its telephony services directly from the high performance integrated ISD/IRG apartment complex amplifier. The ISD/IRG in either the tap or in the home environment, the ISD/IRG will be substantially the same as the prior ISD in the applications filed Dec. 31, 1997 with the exception that the ADSL modem/lifeline will be replaced by a new cable modem/lifeline configuration. Accordingly, the cable modem will need a bypass mechanism whereby a lifeline support can bypass the cable modem and power the critical phone devices within the home. This can be configured substantially the same way as the lifeline bypassing the ADSL modem in the prior applications.

As an alternative embodiment, tap encapsulation of the cable modem will allow a single cable modem to support a plurality of different users such that it may be desirable to include in a cable television tap a cable TV based modem which supports multiple users. In this manner, a single ethernet interface/controller can control the ethernet connection up to as many as 8 different homes. Thereafter, each of the users in each of the different homes may utilize the ethernet connection to couple a cable modem to the home. In still further embodiments, where each of the individual users telephony and/or data is distributed over the cable network, it is desirable to encrypt this data to prevent each of the different users from having access to all other users' telephony and data. Thus, it may be desirable to also include an encrypter in the tap.

Currently, a cable modem requires approximately 10 watts of power consumption. This power consumption is extremely high for lifeline support and does not include the additional power consumption required by a IP telephony. Thus, it seems that lifeline support may require bypassing of the cable modem. In this manner, a new solution is required such as allocating the lowest 4 megahertz of the bandwidth from the tap to the home for lifeline support for the telephone. If the lowest 4 megahertz is allocated to lifeline support for the telephone with an associated voltage implied on this cable, it may be possible not to power the cable modem or to power only the portion of the cable modem such as the QAM modulator A to D converter down converter and television tuner necessary to modulate the 4 kilohertz bandwidth onto the upstream cable transmission path. One issue is that the splitters in the home or located proximate to the home need to be configured to pass the lower 4 kilohertz for lifeline telephony. If the splitters are not configured, they need to be redesigned and implemented with wide bandwidth splitters to include the lower 4 kilohertz for lifeline support. If we are running a lifeline POTS line in the lower 4 kilohertz, the tap may also be required to include a voltage converter to have 48 volt power to the coax cable connection to the home. Essentially one concept is to have all the NIU's go into a sleep cycle 50% of the time and only look for ringing or data on a periodic basis and, Thereby all of the power requirements on the entire system are substantially reduced in that the NIU is only wakened up when it is addressed. So it can be statistically managed such that if a highly unusual number of people on a particular node try and pick up the phone, the system can provide a warning message that the system is currently:overloaded and all the circuits are busy and please try back later. The same thing could be utilized for bandwidth limitations whereby for IP telephony could handled on a statistical method and if the bandwidth is exceeded, it could ask the user to try back later.

For lifeline support an alternative embodiment is to power a low bandwidth amplifier and provide a reduced operational mode whereby lifeline support is sent back at a low bandwidth 4 kilohertz provided over a cable system. One way for implementing this is for the nodes and/or the hub to detect when power has failed on a particular drop line and to implement a lifeline capability for that drop line whereby each telephone will be allocated a 4 kilohertz segment until power on that drop line came back online. In this manner, lifeline could be supported with minimal voltage provided to each of the telephones and power consumption. The power supply at the node, hub and/or network interface unit may detect when power is eliminated or goes down and put itself into a power-down mode with reduced capabilities. The point is that you cannot have the system such that when it comes back up powered that you drop the telephone call, so the requirement is to maintain the telephone call either in the down mode or the if the power returns. So it may be required to use just a single amplifier and/or a single circuitry for handling those services. The safety issue is currently solved by limiting the 90 volts to 20 milliamps downstream to the house.

Referring to again to FIGS. 1 and 1D, the present invention may permit the FMP 32 or C-FMP's 32-1, 32-2, 32-3 to become the lifeline control management console for both monitoring and control for downstream addressable devices, including, but not limited, to addressable terminals, IRG's 22, settops 131, cable modems 114, taps 60, nodes 61, and/or hubs 62 at the headend 63. The FMP 32 may have a display 99 coupled to the FMP 32 for viewing the status of the downstream terminals, IRG's 22, settops 131, cable modems 114, taps 60, nodes 61, and/or hubs 62, collectively defined as downstream devices. The display 99 may include a personal computer or may be a touch screen device or any such suitable apparatus for providing lifeline status information. The touch screen device may permit to view specific information related to the downstream devices, for example, location and equipment status and any other such suitable information and for entering information related to the downstream devices. The display 99 may be located at the headend or at the access network server complex as shown in FIG. 1. The display 99 may provide network fault management by displaying, for example, lifeline status for each of the individually addressable terminal devices, cable modems, settops, IRG's, taps 60 or nodes 61 and/or hubs 62. The FMP 32 may be equipped with, for example, a software program that monitor the plurality of downstream devices and indicate where the individually addressable low power amplifiers 91, 97 have been actuated due to a power failure. In addition, the personal computer may further include a software program allowing a graphical user interface (GUI) indicating any fault status on the system and shown in FIG. 1D. In the event there is a fault or power loss on the network or system, the FMP 32 may display the appropriate tap or node or hub that has been impacted and where life line support has kicked in. This indication may also include the individually addressable low power amplifiers 91, 97 that have been activated due to the fault or power failure. Thus, for example, the display 99 coupled to the FMP 32 may receive information from the FMP 32 and create a map depicting the plurality of addressable downstream devices, low power amplifiers 91, 97 and/or settop devices. Each of the down stream devices, amplifier and settop device, may be uniquely represented by separate symbols and/or coloring schemes. Thus, if a power loss or fault is detected by the FMP 32, the display 99 may be updated to indicate which down stream devices and/or amplifiers are impacted. This may be done by, changing the color of the particular device, for example, tap 60 as displayed on the display, from green to red. In addition, the display may further indicate individual houses that have been impacted due to the power loss or fault. Any suitable technique may be utilized to readily indicate that lifeline support has been actuated in a downstream device and/or settop terminal. In addition, the FMP 32 may automatically notify the associated power company and/or maintenance personnel to service the particular down stream tap or node or hub indicating the power loss. This information may be beneficial in not only determining when communication and/or cable services have been interrupted, but such information may be helpful to power companies in quickly determining power outages in the area. Accordingly, appropriate personnel may be directed to quickly isolate and correct the problem. FMP control personnel may also be notified by the FMP 32 by, for example, paging the appropriate on-call personnel for notification. The on-call personnel may receive a voice message or code from the FMP 32 or in the alternative may be able to remotely log into the FMP 32 to determine which downstream device is currently on lifeline support.

In accordance with the present invention, amplifiers 97 may be located throughout the network on appropriate cable facilities as shown in FIG. 1D. In the alternative, the amplifiers may be located in the downstream devices as indicated by the amplifiers 91. In this manner less amplifiers may be required for providing lifeline support through the network. As discussed above; when a power loss occurs the appropriate low power amplifier is actuated to provide the lifeline support for the appropriate downstream device and/ or set top terminal. As already suggested, where a power loss is indicated, each of the low power amplifiers 91, 97 may be individually addressable such that a test may be run from the FMP 32 to individually cycle or test the amplifier or, in the alternative, the amplifier may periodically run a self test and store its results for a poll. Similarly, the FMP 32 may determine whether the problem is with the individual amplifier, with an actual power loss and/or at the home. Accordingly, the FMP 32 may identify the particular home which has lost power and/or a group of homes that may have suffered a power loss. The IRG 22 may collect data from polled terminal devices in the home, for example, to determine if there exists a power loss. Upon determination of the problem, the FMP 32 at the head end may take appropriate action, for example, notify the power company or maintenance personnel and/or other on-call personnel to address the problem.

In alternate embodiments, the ISD 22 or IRG 22-1 may receive, for example, an interrupt signal from the individual home indicating that power has been lost to the home. This signal may be provided by, for example, a contact closure or upon that is activated upon power loss. Thus, for example, when power is lost to the set top 131, a special signal and/or contact closure may be sent out on the lifeline cable up to the ISD 22 or IRG 22-1 to indicate that power has been lost to the home. The ISD. 22 or IRG 22-1 may further notify the FMP 32 at the headend to take appropriate actions.

In further embodiments, the FMP 32 at the headend may periodically ping or poll a settop terminal 131 and or cable modem 114 or even the downstream devices to determine their status. Thus, the FMP may determine whether, for example, the cable modem has lost power and the FMP may take appropriate action as described above.

The following applications are hereby incorporated by reference as to their entire contents:

1. A Hybrid Fiber Twisted-pair Local Loop Network Service Architecture, U.S. application Ser. No. 09/001,360, filed Dec. 31, 1997;
2. Dynamic Bandwidth Allocation for use in the Hybrid Fiber Twisted-pair Local Loop Network Service Architecture, U.S. application Ser. No. 09/001,425, filed Dec. 31, 1997; now U.S. Pat. No. 6,307,839
4. VisionPhone Privacy Activator, U.S. application Ser. No. 09/001,909, filed Dec. 31, 1997;
5. VisionPhone Form Factor, U.S. application Ser. No. 09/001,583 filed Dec. 31, 1997;
6. VisionPhone Centrally Controlled User Interface With User Selectable Options, U.S. application Ser. No. 09/001,576, filed Dec. 31, 1997;
7. VisionPhone User Interface Having Multiple Menu Hierarchies, U.S. application Ser. No. 09/001,908, now abandoned, filed Dec. 31, 1997;
8. VisionPhone Blocker, U.S. application Ser. No. 09/001,353, now U.S. Pat. No. 5,949,474, filed Dec. 31, 1997;
9. VisionPhone Inter-com For Extension Phones, U.S. application Ser. No. 09/001,358, filed Dec. 31, 1997;
10. Advertising Screen Saver, U.S. application Ser. No. 09/001,574, now abandoned, filed Dec. 31, 1997;
11. Information Display for Visual Communication Device, U.S. application Ser. No. 09/001,906, now U.S. Pat. No. 6,222,520, filed December 31, 1997;
12. VisionPhone Multimedia Announcement Answering Machine, U.S. application Ser. No. 09/001,911, filed Dec. 31, 1997;
13. VisionPhone Multimedia Announcement Message Toolkit, U.S. application Ser. No. 09/001,345, filed Dec. 31, 1997;
14. VisionPhone Multimedia Video Message Reception, U.S. application Ser. No. 09/001,362, now abandoned, filed Dec. 31, 1997;
15. VisionPhone Multimedia Interactive Corporate Menu Answering Machine U.S. application Ser. No. 09/001, 575, now U.S. Pat. No. 6,226,362, filed Dec. 31, 1997; Announcement, 16. VisionPhone Multimedia Interactive On-Hold Information Menus, U.S. application Ser. No. 09/001,356, now U.S. Pat. No. 6,020,916, filed Dec. 31, 1997;

17. VisionPhone Advertisement When Calling Video Non-enabled VisionPhone Users, U.S. application Ser. No. 09/001,361, filed Dec. 31, 1997;

18. Motion Detection Advertising, U.S. application Ser. No. 09/001,355, now abandoned, filed Dec. 31, 1997;

19. Interactive Commercials, U.S. application Ser. No. 09/001,578, now U.S. Pat. No. 6,178,446, filed Dec. 31, 1997;

20. VisionPhone Electronic Catalogue Service, U.S. application Ser. No. 09/001,421, now U.S. Pat. No. 5,970,473, filed Dec. 31, 1997;

21. A Multifunction Interface Facility Connecting Wideband Multiple Access Subscriber Loops with Various Networks, U.S. application Ser. No. 09/001,422, filed Dec. 31, 1997;

22. Life Line Support for Multiple Service Access on Single Twisted-pair, U.S. application Ser. No. 09/001,343, filed Dec. 31, 1997;

23. A Network Server Platform (NSP) For a Hybrid Fiber Twisted-pair (HFTP) Local Loop Network Service Architecture, U.S. application Ser. No. 09/001,582, now U.S. Pat. No. 6,229,810, filed Dec. 31, 1997;

24. A Communication Server Apparatus For Interactive Commercial Service, U.S. Application Ser. No. 09/001,344, filed Dec. 31, 1997;

25. NSP Based Multicast Digital Program Delivery Services, U.S. application Ser. No. 09/001,580, filed Dec. 31, 1997;

26. NSP Internet, JAVA. Server and VisionPhone Application Server, U.S. application Ser. No. 09/001,354, now U.S. Pat. No. 6,044,403, filed Dec. 31, 1997;

27. Telecommuting, U.S. application Ser. No. 09/001,540, filed Dec. 31, 1997;

28. NSP Telephone Directory White-Yellow Page Services, U.S. application Ser. No. 09/001,426, now U.S. Pat. No. 6,052,439, filed Dec. 31 1997;

29. NSP Integrated Billing System For NSP services and Telephone services, U.S. application Ser. No. 09/001,359, filed Dec. 31, 1997;

30. ISD and NSP Caching Server, U.S. application Ser. No. 09/001,419, filed Dec. 31, 1997;

31. An Integrated Services Director (ISD) For HFTP Local Loop Network Service Architecture, U.S. application Ser. No. 09/001,417, filed Dec. 31, 1997;

32. ISD and VideoPhone (Customer Premises) Local House Network, U.S. application Ser. No. 09/001,418, filed Dec. 31, 1997;

33. ISD Wireless Network, U.S. application Ser. No. 09/001,363, filed Dec. 31, 1997;

34. ISD Controlled Set-Top Box, U.S. application Ser. No. 09/001,424, filed Dec. 31, 1997;

35. Integrated Remote Control and Phone, U.S. application Ser. No. 09/001,423, filed Dec. 31, 1997;

36. Integrated Remote, Control and Phone User Interface, U.S. application Ser. No. 09/001,420, now U.S. Pat. No. 6,92,210, filed Dec. 31, 1997;

37. Integrated Remote Control and Phone Form Factor, U.S. application Ser. No. 09/001,910, filed Dec. 31, 1997;

38. VisionPhone Mail Machine, (Attorney Docket No. 3493.73170) U.S. Provisional Application Ser. No. 60/070,104, filed Dec. 31, 1997;

39. Restaurant Ordering Via VisionPhone, (Attorney Docket No. 3493.73171) U.S. Provisional Application Ser. No. 60/070,121, filed Dec. 31, 1997;

40. Ticket Ordering Via VisionPhone, (Attorney Docket No. 3493.73172) U.S. Provisional Application Ser. No. 60/070103, filed Dec. 31, 1997;

41. Multi-Channel Parallel/Serial Concatenated Convolutional Codes And Trellis Coded Modulation Encode/Decoder, U.S. application Ser. No. 09/001,342, now U.S. Pat. No. 6,088,387, filed Dec. 31, 1997;

42. Spread Spectrum Bit Allocation Algorithm, U.S. application Ser. No. 09/001,842, now U.S. Pat. No. 6,008,817, filed Dec. 31, 1997;

43. Digital Channelizer With Arbitrary Output Frequency, U.S. application Ser. No. 09/001,581, filed Dec. 31, 1997;

44. Method And Apparatus For Allocating Data Via Discrete Multiple Tones, U.S. patent application Ser. No. 08/997,167 now U.S. Pat. No. 6,134,274, filed Dec. 22, 1997;

45. Method And Apparatus For Reducing Near-End Cross Talk In Discrete Multi-Tone Modulators/Demodulators, U.S. application Ser. No. 08/997,176, now U.S. Pat. No. 6,144,695, filed Dec. 23, 1997;

46. U.S. patent application 08/943,312 now U.S. Pat. No. 6,061,326, filed Oct. 14, 1997 entitled Wideband Communication System for the Home, to Robert R. Miller, II and Jesse E. Russell; and 47. U.S. patent application No. 08/858,170, now U.S. Pat. No. 6,111,895, filed May 14, 1997, entitled Wide Band Transmission Through Wire, to Robert R. Miller, II, Jesse E. Russell and Richard R. Shively.

The following patent applications are related by subject matter and are concurrently filed herewith (the first listed application being the present application):

1. U.S. application Ser. No. 09/224,287 filed Dec. 31, 1998, (Atty docket no. Gerszberg 86-45-8-26-33, 3493.73133) entitled "A Facilities Management Platform for a Hybrid Coaxial/Twisted Pair Local Loop Network Service Architecture" of Gerszberg et al.

2. U.S. application Ser. No. 09/224,287 filed Dec. 31, 1998, (Atty docket no. Gerszberg 80-39-7-30-27, 3493.73122) entitled "Set Top Integrated Visionphone User Interface Having Multiple Menu Heirarchies" of Gerszberg et al.

3. U.S. application Ser. No. 09/224,281, filed Dec. 31, 1998, (Atty docket no. Gerszberg 84-43-5-24-31, 3493.73131) entitled "Coaxial Cable/Twisted Pair Fed, Integrated Residence Gateway Controlled, Set-top Box" of Gerszberg et al.

4. U.S. application Ser. No. 09/224,285, (Atty docket no Gerszberg 85-44-25-32, 3493.73132) entitled "A Network Server Platform (NSP) for a Hybrid Coaxial/Twisted Pair Local Loop Network Service Architecture" of Gerszberg et al.

5. U.S. application Ser. No. 09/224,283, filed Dec. 31, 1998, (Atty docket no. Gerszberg 70-31-4-29-19, 3493.73031) entitled "Coaxial Cable/Twisted Pair Cable Telecommunications Network Architecture" of Gerszberg et al.

6. U.S. application Ser. No. 09/224,290, filed Dec. 31, 1998, (Atty docket no. Gerszberg 87-46-1-23-34, 3493.73134) entitled "Intercom for Extension Phones Using an ISD in a Cable Environment" of Gerszberg et al.

7. U.S. application Ser. No 09/224,288, filed Dec. 31, 1998, (Atty docket no. Gerszberg 88-47-27-35-17, 3493.73135) entitled "Cable Connected WAN Interconnectivity Services for Corporate Telecommuters" of Gerszberg et al.

8. U.S. application Ser. No. 09/224,284, (Atty docket no. Gerszberg 89-48-36-18, 3493.73136) "Cable Connected NSP for Telephone White-Yellow Page Services and Emergency 911 Location Identification" of Gerszberg et al.

9. U.S. application Ser. No. 09/224,282, filed Dec. 31, 1998, (Atty docket no. Gerszberg 90-49-6-37, 3493.73137)

entitled "A Network Server Platform for Providing Integrated Billing for CATV, Internet, Telephony and Enhanced Communications Services" of Gerszberg et al.

10. U.S. application Ser. No. 09/224,289, filed Dec. 31, 1998, (Atty docket no. Gerszberg 91-50-2-28-38, 3493.77805) entitled "Method and Apparatus for Providing Uninterrupted Service in a Hybrid Fiber Coaxial System" by Gerszberg et al.

11. U.S. application Ser. No. 09/224,276, filed Dec. 31, 1998, (Atty docket no. Gerszberg 92-51-3-39, 3493.77806) entitled "Lifeline Service for HFCLA Network Using Wireless ISD" of Gerszberg et al.

While exemplary systems and methods embodying the present invention are shown by way of example, it will be understood, of course, that the invention is not limited to these embodiments. Modifications may be made by those skilled in the art, particularly in light of the foregoing teachings. For example, each of the elements of the aforementioned embodiments may be utilized alone or in combination with elements of the other embodiments.

We claim:

1. A facility management platform for providing fault management in a cable network for a plurality of downstream devices located in said cable network, said cable network further having a plurality of low power amplifiers disposed therein, the facility management platform comprising:

a controller;

a display;

said controller for viewing status of said plurality of downstream devices and for determining whether power to said downstream devices has been lost;

said display for displaying a geographic map of said cable network showing said plurality of downstream devices and graphically illustrating when said controller has determined that power to said downstream devices has been lost.

2. The facility management platform of claim 1, wherein said plurality of downstream devices includes at least one of a integrated residential gateway, cable tap, cable node, cable hub, cable settop terminal, and cable modem.

3. The facility management platform of claim 1, wherein said controller for further determining whether said low power amplifier disposed in said cable network has been actuated.

4. The facility management platform of claim 3, wherein said controller for separately addressing said plurality of low power amplifiers to individually test each of said amplifiers.

5. The facility management platform of claim 4, said test for determining whether an actual power loss has occurred at said downstream devices.

6. The facility management platform of claim 1, wherein said controller for automatically notifying one of a power company and maintenance personnel when said controller determines that power to said downstream devices has been lost.

7. The facility management platform of claim 1, wherein said display being a touch screen display for viewing and inputting additional information related to said plurality of downstream devices.

8. The facility management platform of claim 1, wherein said controller:

determining which downstream devices are currently on lifeline support; and graphically illustrating said downstream devices currently on lifeline support on said display.

9. The facility management platform of claim 1, wherein said controller:

periodically polling said plurality of downstream devices;

determining which downstream devices are currently on lifeline support; and graphically illustrating said downstream devices currently on lifeline support on said display.

10. A system for fault management and control in a cable network, comprising:

a facility management platform coupled to said cable network;

a plurality of downstream devices disposed in said cable network for providing cable services to subscribers;

a plurality of individually addressable low power amplifiers disposed in said cable network for providing lifeline support;

a cabling facility connecting said facility management platform to said plurality of downstream devices and for providing power and lifeline support to said plurality of downstream devices for servicing said subscribers;

said facility management platform for monitoring said plurality of downstream devices and determining which of said plurality of downstream devices have lost power, appropriately notifying an associated power company and testing said low power amplifiers to isolate problems related to power loss.

11. A method of graphically illustrating status of downstream devices at a facility management platform of a network, said method comprising the steps of:

periodically polling said downstream devices;

determining which of said downstream devices are on lifeline support;

graphically illustrating said downstream devices currently on lifeline support on a display;

notifying an associated power company; and performing tests to isolate problem s related to power loss.

* * * * *